US009647998B2

(12) United States Patent
Ronca

(10) Patent No.: US 9,647,998 B2
(45) Date of Patent: May 9, 2017

(54) GEO-FENCING CRYPTOGRAPHIC KEY MATERIAL

(71) Applicant: Venafi, Inc., Salt Lake City, UT (US)

(72) Inventor: Remo Ronca, Salt Lake City, UT (US)

(73) Assignee: Venafi, Inc., Salt Lake City, UT (US)

( * ) Notice: Subject to any disclaimer, the term of this patent is extended or adjusted under 35 U.S.C. 154(b) by 0 days.

(21) Appl. No.: 14/221,981

(22) Filed: Mar. 21, 2014

(65) Prior Publication Data

US 2015/0271155 A1    Sep. 24, 2015

(51) Int. Cl.
*H04L 29/06* (2006.01)
*H04L 9/08* (2006.01)
*H04L 9/32* (2006.01)

(52) U.S. Cl.
CPC ........ *H04L 63/0492* (2013.01); *H04L 9/0872* (2013.01); *H04L 9/321* (2013.01); *H04L 9/3263* (2013.01); *H04L 63/0876* (2013.01)

(58) Field of Classification Search
CPC .............................................. G06F 2221/2111
USPC .......................................................... 713/168
See application file for complete search history.

(56) References Cited

U.S. PATENT DOCUMENTS

| | | | |
|---|---|---|---|
| 5,659,617 A | 8/1997 | Fischer | |
| 6,044,462 A | 3/2000 | Zubeldia et al. | |
| 6,108,788 A | 8/2000 | Moses et al. | |
| 7,120,254 B2 | 10/2006 | Glick et al. | |
| 7,275,102 B2 | 9/2007 | Yeager et al. | |
| 7,848,765 B2 | 12/2010 | Phillips et al. | |
| 7,961,884 B2 | 6/2011 | Edgett et al. | |
| 8,276,209 B2 | 9/2012 | Knibbeler et al. | |
| 8,327,417 B2 | 12/2012 | Carter et al. | |
| 8,560,839 B2 | 10/2013 | Barham et al. | |
| 8,621,222 B1 | 12/2013 | Das | |
| 2002/0106085 A1 | 8/2002 | Jain et al. | |
| 2002/0136407 A1* | 9/2002 | Denning | G06F 21/10 380/258 |
| 2004/0203908 A1 | 10/2004 | Hind et al. | |
| 2006/0059096 A1 | 3/2006 | Dublish et al. | |

(Continued)

OTHER PUBLICATIONS

U.S. Appl. No. 14/221,919, filed Mar. 21, 2014, Geo-Fencing Crytographic Key Material.

(Continued)

*Primary Examiner* — Jason K Gee
(74) *Attorney, Agent, or Firm* — Schwegman Lundberg & Woessner, P.A.

(57) ABSTRACT

In representative embodiments, a geo-fence cryptographic key material comprising a geo-fence description defining a geographic area and associated cryptographic key material is assigned to an entity for use in authenticated communications. The validity of the cryptographic material changes state based on whether the entity is inside or outside the geographic area. This is accomplished in a representative embodiment by suspending the validity of the cryptographic key material when the entity is outside the geographic area and reinstating the validity of the cryptographic key material when the entity is inside the geographic area. A geographic update service determines the validity of the cryptographic material in part using location updates sent by the entity. Entities that are not geo-aware can delegate the location update to a geo-aware device. Encryption can be used to preserve privacy.

20 Claims, 13 Drawing Sheets

(56) References Cited

U.S. PATENT DOCUMENTS

| | | | |
|---|---|---|---|
| 2007/0074036 A1 | 3/2007 | Ramzan et al. | |
| 2009/0187983 A1 | 7/2009 | Zerfos et al. | |
| 2009/0235071 A1 | 9/2009 | Bellur et al. | |
| 2010/0148947 A1 | 6/2010 | Morgan et al. | |
| 2010/0211787 A1 | 8/2010 | Bukshpun et al. | |
| 2011/0162048 A1* | 6/2011 | Bilbrey | H04W 8/005 726/4 |
| 2012/0159156 A1* | 6/2012 | Barham | G06F 21/6218 713/156 |
| 2012/0280783 A1 | 11/2012 | Gerhardt et al. | |
| 2012/0328101 A1 | 12/2012 | Lakshminarayanan | |
| 2013/0091452 A1 | 4/2013 | Sorden et al. | |
| 2013/0191640 A1 | 7/2013 | Bloomer | |
| 2013/0267253 A1 | 10/2013 | Case et al. | |
| 2013/0347058 A1* | 12/2013 | Smith | G06F 21/57 726/1 |
| 2014/0052981 A1 | 2/2014 | King | |
| 2014/0380047 A1 | 12/2014 | Denning et al. | |
| 2015/0057838 A1 | 2/2015 | Scholl et al. | |
| 2015/0101012 A1 | 4/2015 | White et al. | |
| 2015/0271144 A1 | 9/2015 | Ronca | |
| 2015/0271154 A1 | 9/2015 | Ronca | |
| 2015/0271156 A1 | 9/2015 | Ronca | |
| 2015/0271157 A1 | 9/2015 | Ronca | |
| 2015/0271158 A1 | 9/2015 | Ronca | |

OTHER PUBLICATIONS

U.S. Appl. No. 14/222,046, filed Mar. 21, 2014, Geo-Fencing Crytographic Key Material.

U.S. Appl. No. 14/255,710, filed Apr. 17, 2014, Rule-based Validity of Crytographic Key Material.

U.S. Appl. No. 14/255,745, filed Apr. 17, 2014, Rule-based Validity of Crytographic Key Material.

U.S. Appl. No. 14/255,762, filed Apr. 17, 2014, Rule-based Validity of Crytographic Key Material.

"U.S. Appl. No. 14/222,046, Non Final Office Action mailed Jul. 27, 2015", 38 pgs.

"U.S. Appl. No. 14/221,919, Non Final Office Action mailed Jan. 5, 2016", 29 pgs.

"U.S. Appl. No. 14/221,919, Non Final Office Action mailed Jul. 17, 2015", 38 pgs.

"U.S. Appl. No. 14/221,919, Response filed Oct. 27, 2015 to Non Final Office Action mailed Jul. 17, 2015", 29 pgs.

"U.S. Appl. No. 14/222,046, Non Final Office Action mailed Jul. 27, 2015", 39 pgs.

"U.S. Appl. No. 14/222,046, Response filed Dec. 28, 2015 to Non Final Ofice Action mailed Jul. 27, 2015", 29 pgs.

"U.S. Appl. No. 14/255,710, Non Final Office Action mailed Sep. 25, 2015", 14 pgs.

"U.S. Appl. No. 14/255,745, Non Final Office Action mailed Sep. 30, 2015", 15 pgs.

"U.S. Appl. No. 14/255,762, Non Final Office Action mailed Sep. 28, 2015", 19 pgs.

U.S. Appl. No. 14/255,710, Response filed Jan. 25, 2016 to Non Final Office Action mailed Sep. 25, 2015, 23 pgs.

U.S. Appl. No. 14/255,745, Reponse filed Jan. 28, 2016 to Non Final Office Action mailed Sep. 30, 2015, 22 pgs.

U.S. Appl. No. 14/255,762, Response filed Jan. 28, 2016 to Non Final Office Action mailed Sep. 28, 2015, 23 pgs.

U.S. Appl. No. 14/221,919, Response filed Apr. 5, 2016 to Non Final Office Action mailed Jan. 5, 2016, 18 pgs.

U.S. Appl. No. 14/222,046, Non Final Office Action mailed Apr. 25, 2016, 25 pgs.

U.S. Appl. No. 14/255,710, Final Office Action mailed May 2, 2016, 15 pgs.

U.S. Appl. No. 14/255,745, Examiner Interview Summary mailed Apr. 13, 2016, 5 pgs.

U.S. Appl. No. 14/255,745, Final Office Action mailed Mar. 17, 2016, 19 pgs.

U.S. Appl. No. 14/255,745, Response filed May 17, 2016 to Final Office Action mailed Mar. 17, 2016, 16 pgs.

U.S. Appl. No. 14/255,762, Final Office Action mailed May 4, 2016, 20 pgs.

U.S. Appl. No. 14/221,919, Final Office Action mailed Jul. 18, 2016, 28 pgs.

U.S. Appl. No. 14/255,710, Examiner Interview Summary mailed Jul. 7, 2016, 3 pgs.

U.S. Appl. No. 14/255,710, Response filed Jul. 5, 2016 to Final Office Action mailed May 2, 2016, 18 pgs.

U.S. Appl. No. 17/255,762, Examiner Interview Summary mailed Jul. 7, 2016, 3 pgs.

U.S. Appl. No. 14/255,762, Response filed Jul. 5, 2016 to Final Office Action mailed May 4, 2016, 19 pgs.

"U.S. Appl. No. 14/221,919, Response filed Apr. 5, 2016 to Non Final Office Action mailed Jan. 5, 2016", 18 pgs.

"U.S. Appl. No. 14/222,046, Non Final Office Action mailed Apr. 25, 2016", 25 pgs.

"U.S. Appl. No. 14/255,710, Final Office Action mailed May 2, 2016", 15 pgs.

"U.S. Appl. No. 14/255,745, Examiner Interview Summary mailed Apr. 13, 2016", 5 pgs.

"U.S. Appl. No. 14/255,745, Final Office Action mailed Mar. 17, 2016", 19 pgs.

"U.S. Appl. No. 14/255,745, Response filed May 17, 2016 to Final Office Action mailed Mar. 17, 2016", 16 pgs.

"U.S. Appl. No. 14/255,762, Final Office Action mailed May 4, 2016", 20 pgs.

"U.S. Appl. No. 14/221,919, Response filed Sep. 19, 2016 to Final Office Action mailed Jul. 18, 2016", 11 pgs.

"U.S. Appl. No. 14/222,046, Response filed Oct. 25, 2016 to Non Final Office Action mailed Apr. 25, 2016", 25 pgs.

"U.S. Appl. No. 14/255,710, Notice of Allowance mailed Aug. 17, 2016", 11 pgs.

"U.S. Appl. No. 14/255,745, Non Final Office Action mailed Jul. 27, 2016", 11 pgs.

"U.S. Appl. No. 14/255,745, Nortice of Allowance mailed Oct. 13, 2016", 10 pgs.

"U.S. Appl. No. 14/255,745, Response filed Aug. 10, 2016 to Non Final Office Action mailed Jul. 27, 2016", 8 pgs.

"U.S. Appl. No. 14/255,762, Non Final Office Action mailed Oct. 25, 2016", 10 pgs.

Al-Fuqaha, et al., "Geo-encryption protocol for mobile networks", Computer Communications, (2007), 2510-2517.

* cited by examiner

US 9,647,998 B2

GEO-FENCING CRYPTOGRAPHIC KEY MATERIAL

FIELD

This application relates generally to managing trust relationships between computer systems and, in an example embodiment, a system that creates a geographic fence for cryptographic key material.

BACKGROUND

In an authentication context aimed at authenticating a client against a service using cryptographic key material, access is granted or denied based on cryptographic evidence that the authenticating client has control over a specific key part, only known to the client, in the case of an asymmetric cryptographic approach, or shared between the client and the service provider, in the case of a symmetric cryptographic approach. Various standards and technologies are employed to accomplish the authentication of a client to a service, server, or peer such as X.509 certificates and related public key infrastructure (PKI) used in Transport Layer Security (TLS) and its predecessor, Secure Sockets Layer (SSL), Secure Shell (SSH) and its related infrastructure, and other such technologies.

With the proliferation of sensitive and private information that is stored on and carried by computers, devices, networks and so forth, security and privacy have become increasingly important. Also, significant efforts have been devoted to minimizing attack surfaces in networks to enhance security.

BRIEF DESCRIPTION OF DRAWINGS

The present disclosure is illustrated by way of example and not limitation in the figures of the accompanying drawings, in which like references indicate similar elements and in which.

DETAILED DESCRIPTION

Figure 1:
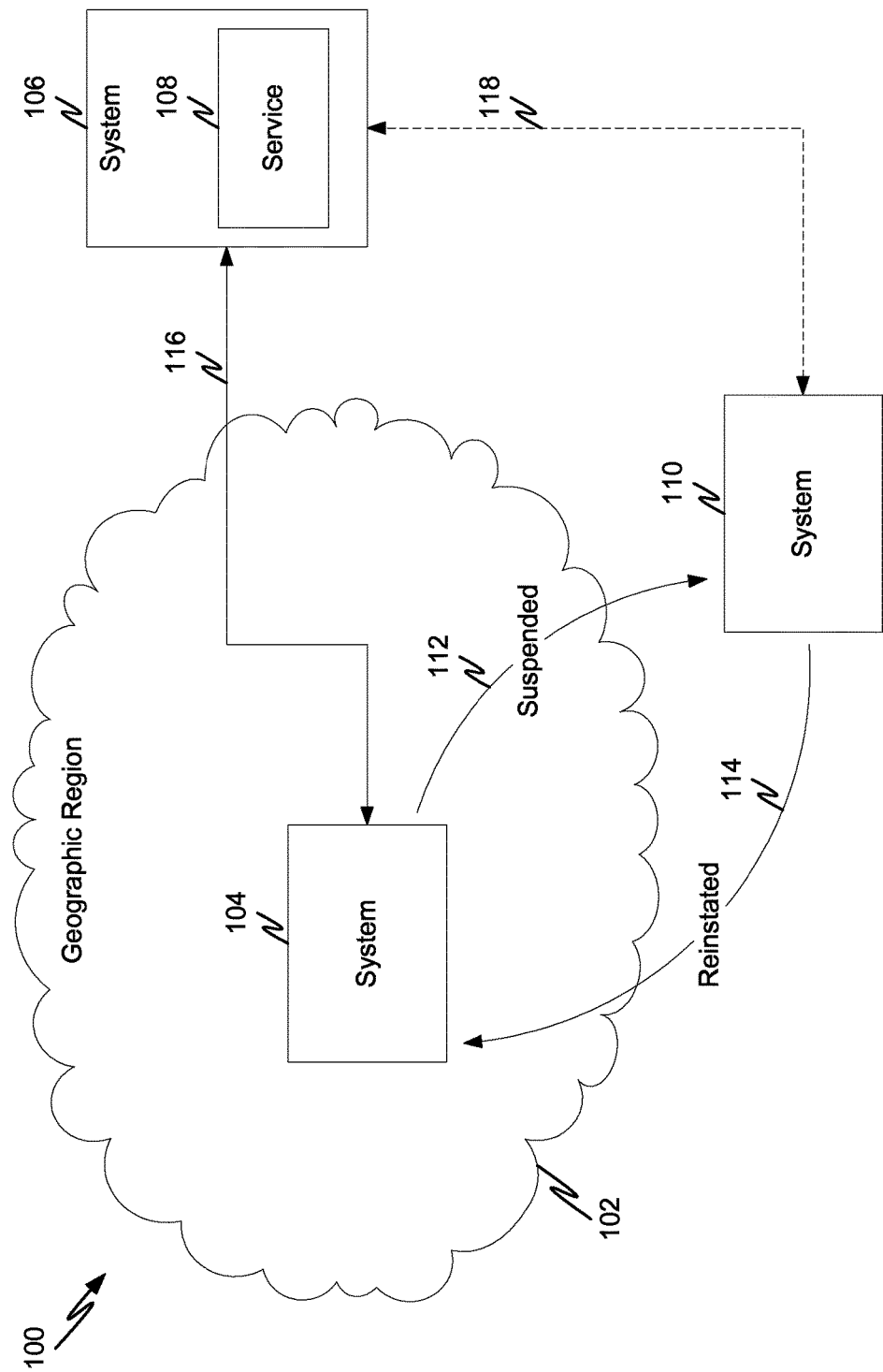
FIG. 1 illustrates a basic system where a system moves into and out of a defined geographic region.

In the following description, for purposes of explanation, numerous specific details are set forth to provide a thorough understanding of example embodiments. It will be evident to one skilled in the art, however, that the present subject matter may be practiced without these specific details.

Overview

This disclosure describes systems and methods that include additional evidence into the authentication infrastructure by associating geo-location positioning with the cryptographic key material used for authentication. In the embodiments below, no specific representation of the geo-location coordinates is required. All that is needed is the ability of a system or service to evaluate one or more geographic coordinates to identify whether they fall within or outside of a defined geographic area. Various mechanisms exist that accomplish this task and that are suitable for use with the disclosure herein.

In representative embodiments, a client's cryptographic key material is associated with a geo-fence attribute set that specifies parameters such as a geographic region (e.g., defined by a geo-fence) within which the client's cryptographic key material is authorized for authentication. The client's geo-location is compared to the geo-fence to identify whether the client may establish authenticated communications using the cryptographic key material. Evidence of the client's location within the geo-fence allows the client to establish authenticated communications using the cryptographic key material, while a location outside the fence results in a suspension of the key material's applicability. Some embodiments support the reverse situation (e.g., the evidence of a client being within a geo-fence might result in suspending the cryptographic key material, whereas a location outside the fence re-instates the key material). In some embodiments, a mandatory update containing the location of the client allows the system to suspend the client's key material if the client's location is unknown for a pre-defined time interval. Additionally, or alternatively, crossing the geo-fence may trigger an update containing the location of the client.

To meet privacy concerns regarding the encoding of geo-location coordinates and the tracing of a client's movements, an obfuscation scheme such as encryption can be employed to conceal the geo-location coordinates of the client. A delegation system can be used to identify authorized entities that can decrypt and utilize the geo-location information.

If a geo-location sensor is unavailable or inaccessible on the same device where the cryptographic key material resides (e.g., the client), an authorization scheme for delegating decryption of the potentially encrypted geo-location coordinates as well as authenticating the geo-location update messages on behalf of the geo-fenced cryptographic key material may be used. A real-time authorization protocol between the geo-location aware device and the device bearing the cryptographic key material based on a short distance protocol such as low power Bluetooth or a near-field communication may be used instead of or in addition to a static authorization assignment.

In some embodiments, the geo-fence evaluation is processed on the geo-location aware device (e.g., the client or delegated device) resulting in a geo-location update message or an immediate event trigger to update the status of the cryptographic key material (e.g., suspended or reinstated). In other embodiments, a service receiving the update message performs the evaluation instead (or in addition to). By tying the geo-location update exclusively to an imminent authentication or if the geo-fence evaluation is performed on the geo-location aware device, the number of geo-location update messages can be kept to a minimum.

In this specification reference is made to various standards published by the Internet Engineering Task Force (IETF). These standards are published in documents with the naming convention: RFC XXXX, where XXXX is a number. The standards (e.g., RFC documents) are available on the IETF website (www.ietforg).

DEFINITIONS

In this disclosure, the following terms and definitions will be used.

Client means the system, user, device, account, and so forth that initiates a secure connection, such as when a secure connection request is sent. A system, device, virtual machine, groups thereof, and so forth may have multiple clients.

Server means the system, host, device, account, and so forth that receives a secure connection request (e.g., from a client). A system, device, virtual machine, groups thereof, and so forth may have multiple servers.

Client/Server means a system, device, virtual machine, groups thereof and so forth that function both as a client and a server (e.g., has at least one client and at least one server).

Entity is a term that encompasses at least system, device, virtual machine, client, server, user, account, and so forth that can utilize cryptographic key material as part of authenticated communications.

Subscriber means an entity that requests or obtains cryptographic key material for authenticated communications.

Certificate means an electronic document that uses a digital signature to bind a public key with an identity. The certificate can be used to verify that a public key belongs to an individual, usually through cryptographic means and/or protocols.

Geo-fence (GF) means a virtual perimeter for a real-world geographic area. A geo-fence can be dynamically generated or can be a predefined boundary and/or set of boundaries. A geo-fence can be absolute, such as defining an absolute geographic area or it can be relative such as defining a geographic area relative to one or more reference locations (e.g., a geographic location and/or coordinate) and/or landmarks (e.g., within a building or on the corner of main and robin streets and so forth).

Geo-fence attribute set (GFAS) means a set of attributes that form the basis for determining the validity status of cryptographic key material associated with the GFAS. A GFAS may be stored in a data structure of some sort or can be stored as separate attributes or can exist as separate or groups of attributes stored in various locations and/or data structures. In other words, the GFAS need not be stored as a single collection of attributes to be considered a GFAS. The GFAS can include one or more of:
1. geo-fence information;
2. delegate identifier(s) and/or other delegate information for things like delegation of decryption of various items, delegation of geo-location determination, service where geo-location update messages should be sent, delegation of verification/validation of various items, and so forth;
3. policy information;
4. key instance(s) and/or identifier(s) of associated cryptographic key material (e.g., some way to indicate the related cryptographic key material); and/or
5. other information.

Geo-fenced certificate (GFC), sometimes referred to as a geo-fence certificate, means a certificate having GFAS information associated or embedded therewith.

Geo-fenced Key Material (GFKM), sometimes referred to as geo-fence key material, is used herein to encompass both GFC and GFAS and associated cryptographic key material.

Validity state, means the state of a GFC and/or cryptographic key material associated with GFAS either as valid or as not valid. In this disclosure terms like invalidate, suspend, revoke and so forth will be used to indicate a state where the GFC and/or cryptographic key material associated with GFAS is not valid and terms like reinstate, reissue and so forth will be used to indicate a state where the GFC and/or cryptographic key material associated with GFAS is valid. No distinction is intended other than to note that some implementations may suspend and then reinstate the same GFC and/or cryptographic key material while others may revoke the old GFC and/or cryptographic key material and reissue a new GFC and/or cryptographic key material.

Cryptographic key material means a key, key pair, key instance, and so forth that is used in authenticated communications.

Key pair (KP) means a public/private key combination where the private key may decrypt information encrypted by the public key or where a public key verifies signatures created by the private key.

Key set (KS) means all instances of a particular key pair. The key set may be a client key set or a server key set.

Key instance (KI) means a single instance of a particular key or key set. The key instance may be a client key instance, a server key instance or a key set instance. Key instance may be part of a key set, or a singular occurrence of a public or private key.

Key options mean one or more options provided by a particular implementation (e.g. SSH or other implementation) such as source control (e.g., allow and/or deny access from a particular source to a particular destination), forced commands, source restriction (e.g., allow and/or deny access based on source such as the address, name, distinguished name, or other identifier of a system or other location from which or to which connection may be made), location control (including geographic, business, current, and so forth), and other options that may apply to limit or grant use of the trust relationship (e.g. no X11 forwarding, no agent forwarding, no port forwarding, etc.) and so forth.

Key properties, also referred to as key characteristics, mean one or more characteristics of a key, key pair, key set, key instance, etc. such as key length, the algorithm used to generate the key and so forth. Key characteristics also includes properties about the key such as contact information of a person responsible for or related to the key, authorized storage location(s) for the key, and so forth.

Client Trust (CT) means a trust relationship where it is established that a client private key is linked to the authorized public key on a server. This is often evidenced by way of having the client public key stored in server side authorized key file.

Server Trust (ST) means a trust relationship where it is established that the server public key is known by the client. This is often evidenced by way of having the server public key stored in client side user known host key file and/or global known host key file.

Trust relationship means CT and/or ST. A trust relationship exists where CT and/or ST exist between a client and server.

DESCRIPTION

The description that follows includes illustrative systems, methods, user interfaces, techniques, instruction sequences, and computing machine program products that exemplify illustrative embodiments. In the following description, for purposes of explanation, numerous specific details are set forth in order to provide an understanding of various embodiments of the inventive subject matter. It will be evident, however, to those skilled in the art that embodiments of the inventive subject matter may be practiced without these specific details. In general, well-known instruction instances, protocols, structures, and techniques have not been shown in detail.

FIG. 1 illustrates a basic system 100 where a system 104 moves into and out of a defined geographic region 102. In describing FIG. 1, the term GFKM will be used with the understanding that different embodiments can use GFC and/or GFAS with associated cryptographic key material. In this illustration, the system 104 has a GFKM comprising geo-fence information defining a geographic region 102 and cryptographic key material (e.g., in the form of a GFC and/or cryptographic key material associated with GFAS) for use in authenticated communications 116 with the system 106. The system 104 may be a client or a server, depending on the embodiment. As the system 104 moves across the geo-fence that defines the geographic region 102, the status of the system's 104 associated GFKM is changed from suspended to reinstated, depending on the location of the system 104.

In the illustrated embodiment, when the system 104 moves outside of the geographic region 102, its GFKM is suspended as indicated by arrow 112. Thus, the system 110 represents the system 104 residing outside of the geographic region 102 having its GFKM suspended (e.g., an invalid GFKM). While the system 110 resides outside of the geographic region 102, any attempt to establish authenticated communications with the system 106 will result in the system 106 discovering that the GFKM status for the system 110 is invalid. Thus the system 110 will be unable to establish authenticated communications with the system 106. Unsuccessful authenticated communications between the system 110 (e.g., system 104 now residing outside of the geographic region 102) and the system 106 is illustrated by arrow 118. The system 106 can include a service 108 that checks the validity of the system's 110 GFKM when authenticated communications are attempted by the system 110.

When the system 110 moves inside of the geographic region 102, the GFKM is reinstated so that it is valid for authenticated communications. Reinstatement of the GFKM is illustrated by arrow 114 and successful authenticated communications between the system 104 and the system 106 is illustrated by arrow 116. The system 104 represents the system 110 residing inside of the geographic region 102 with a valid GFKM status.

While the embodiment of FIG. 1 discusses suspension and reinstatement of the GFKM, alternative embodiments can accomplish the same effect by revoking the existing GFKM and issuing a new, valid GFKM rather than suspending and then reinstating the same GFKM. In this disclosure terms like invalidate, suspend, revoke and so forth will be used to indicate a state where the GFKM is not valid and terms like reinstate, reissue, validate, and so forth will be used to indicate a state where the GFKM is valid. No distinction is intended other than to note that some implementations may suspend and then reinstate the same GFKM and while others may revoke the old GFKM and reissue a new GFKM.

Various mechanisms exist in various embodiments to accomplish the suspension and reinstatement of GFKM as an entity moves across a geo-fence. Typically such embodiments have 1) a mechanism for an entity to obtain appropriate cryptographic key material and an associated geo-fence; 2) a mechanism for updating the geo-location of the entity so that its location can be assessed relative to a geo-fence; and 3) a repudiation service, validation service or other mechanism to ascertain the validity of the cryptographic key material based on the location of the entity. The embodiments used to accomplish these mechanisms will be different depending on the protocols and infrastructure used for authentication. For example, X.509 certificates using a PKI for authentication may implement the mechanisms differently than embodiments built upon SSH for authentication. Furthermore, some implementations may rely on a custom or semi-custom collection of services, cryptographic key material, GFAS, systems and so forth to accomplish these functions.

Additionally, or alternatively, when GFKMs are issued, the validity state can be set to be either valid or invalid. In some embodiments, the validity state is set to valid after issue and remains valid until the geo-location of the system, the policies, and so forth indicate that its status should be set to invalid. In some embodiments, the validity state is set to invalid after issue and remains invalid until the geo-location of the system, the policies, and so forth indicate that its status should be set to valid. While both approaches are appropriate in different situations, setting the "default" state to invalid and only changing the state to valid after the system shows that it meets the criteria for a valid GFKM may provide a better default security state. The above "default" state discussion applies to all the embodiments described herein.

Figure 2:
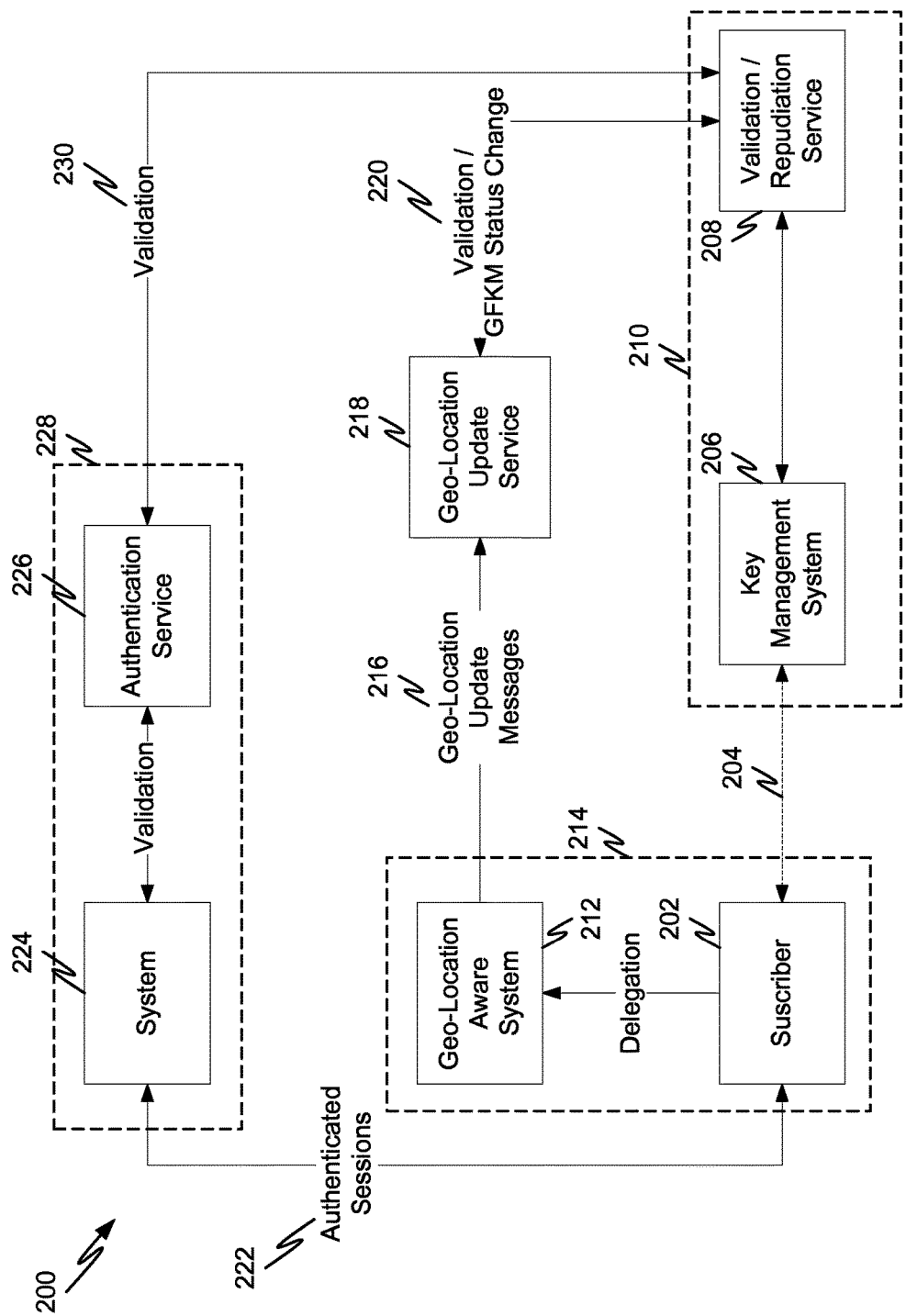
FIG. 2 illustrates representative system interactions to issue and utilize geo-fenced key material.

FIG. 2 illustrates representative system interactions 200 to issue and utilize GFKM in a general embodiment. This embodiment may be used, for example, with SSH type authentication. In this embodiment, a subscriber 202 obtains appropriate cryptographic key material. When SSH is used for authentication, a key pair is generally generated on the subscriber system. However, a centralized key management system 206 may also either generate the key pair or direct generation of the key pair on subscriber 202 so that the key pair complies with appropriate policies such as using/assigning appropriate key properties and/or key options. Policies relating to key management on the centralized key management system 206 may also define the geo-fence information to be associated with cryptographic key material. Interactions between the subscriber 202 and the key management system 206 are indicated by arrow 204.

While implementations using SSH for authentication do not usually refer to cryptographic key material as being embedded in or associated with certificates, in describing the remainder of this embodiment, the term GFKM will be used. For the description of this embodiment, the term GFKM will be used to refer to cryptographic key material and associated GFAS. Different SSH implementations may not store or relate the cryptographic key material and the GFAS in the same manner. For example, the cryptographic key material can be stored in a key file, as typically dictated by various SSH implementations. The GFAS can be stored in the key file and/or separately in a different location(s), as key options, as key properties, or in some other fashion. However, the cryptographic key material and GFAS are associated, along with other optional information, to form the GFKM. As defined above, the information that forms this GFKM can include one or more of the following information:

1) geo-fence information;
2) delegate identifier(s) and/or other delegate information for things like delegation of decryption of various items, delegation of geo-location determination, service where geo-location update messages should be sent, delegation of verification/validation of various items, and so forth;
3) policy information;
4) key instance(s) and/or identifier(s) of associated cryptographic key material (e.g., some way to indicate the related cryptographic key material); and/or
5) other information.

Different embodiments may have different combinations of the information and store the information in different ways.

While some subscribers are geo-location aware, meaning that they have sensors or other means to determine the geo-location of the subscriber, other subscribers are not. Thus, in some embodiments, aspects related to geo-location can be delegated to a geo-location aware system/device 212. For example, the subscriber may be a user account located on a laptop without geo-location sensors (e.g., global positioning sensor (GPS), accelerometers, and so forth) while the geo-location aware device may be the user's mobile phone, which has the ability to determine its geo-location.

Delegation may be accomplished via a real-time authorization protocol between the geo-location aware system 212 and the subscriber 202 based on a short distance protocol such as low power Bluetooth or a near-field communication. Delegation may also be accomplished using a static authorization assignment, for example the appropriate policy may allow a user to use her specified mobile phone as the geo-location aware device. Thus, in some embodiments delegation uses static or pre-authorized delegation to a device or system. In other embodiments, dynamic delegation is used. In still further embodiments, both static and dynamic delegation is used. In all of these embodiments, communications between the subscriber 202 and the geo-location aware system 212 may be wireless such as over low power Bluetooth or near field communication so that delegation only occurs when the two systems are in close proximity to each other. In other embodiments wired connections can be used.

Whether delegation can occur, the conditions under which delegation can occur, the mechanism used for delegation, the authorized entities that can be delegated to and so forth may be controlled by policies or in some other way. Policies can also be hierarchical in nature so that "lower" level policies can be overridden by "higher" level policies. For example, the user can authorize delegation, but the company can limit or override the authorization consistent with its security goals and infrastructure. Thus, in some embodiments the key management system 206 plays a role in determining authorized delegates, related conditions and/or mechanisms. In other embodiments, the subscriber 202 plays a role in determining authorized delegates, related conditions and/or mechanisms. In still further embodiments, a combination plays a role in determining authorized delegates, related conditions and/or mechanisms.

Dashed box 214 indicates that the subscriber 202 and the geo-location aware system 212 may be the same system, device, or so forth. From this point on, the description of FIG. 2 will refer to system 214 as a unit, rather than trying to differentiate embodiments where the subscriber 202 and or the geo-location aware system 212 perform various actions. However, it will be clear to one of ordinary skill in the art how to apply this description to embodiments where delegation of geo-location functions to the geo-location aware system 212 occurs.

Geo-location update service 218 ascertains when to change the validity status of the GFKM associated with system 214. As described elsewhere, determining the proper validity status of the GFKM associated with system 214 involves an assessment of the location of system 214 relative to the geo-fence. Also as described elsewhere, in some embodiments, determining the proper validity status of the GFKM associated with system 214 also involves other information such as the time since the location of system 214 has been determined and/or other policy information. In some sense, the geo-fence information may be thought of as just another aspect of a policy and some embodiments treat it as such. The geo-fence evaluation is performed by different entities, depending on the embodiment. In some embodiments, the geo-fence evaluation can be performed by the geo-location update service 218. In other embodiments, the geo-fence evaluation can be performed by the system 214. In other embodiments, the geo-fence evaluation can be performed by other entities.

In some embodiments, the location of the system 214 is passed to a geo-location update service 218 so that an assessment of the location of the system 214 relative to the geo-fence can be ascertained. The location updates are indicated in the embodiment of FIG. 2 by geo-location update message 216. The purpose of the geo-location update service 218 is to determine when to set the status of the GFKM as valid and when to set the status of the GFKM as not valid based on the location of the system 214 and other relevant information. The information in the geo-location update message 216 is sufficient to allow proper assessment of the conditions relevant to this determination when coupled with information the geo-location update service 218 has access to by other means. Thus, in some embodiments all the relevant information is sent via the geo-location update message. In other embodiments some information is sent via the geo-location update message and other information is either known locally or access remotely or a combination thereof. For example, the geo-location update service can be implemented by or as part of a centralized key management system, such as system 210. In such an implementation, the centralized key management system may have access to all the information needed to perform the evaluation, except the geo-location of the system 214. Where the geo-location update service is implemented separately from the centralized key management system 210, a typical embodiment includes the location of the system 214 as well as relevant geo-fence information in the geo-location update message. Different embodiments include either more or less information, such as the information outlined below.

In order to ascertain what the status of the GFKM should be, the geo-location update service 218 accesses the location of the system 214, the geo-fence data associated with the cryptographic key material, and/or other information that may also be used to determine the validity of the GFKM. Such other information may be defined in one or more policies and contain things like a schedule (e.g., time of day, day of week, and so forth), the length of time since the last geo-location update message, or any other desired information. Using the information, the geo-location update service 218 can apply various methods to determine whether to change the validity status of the GFKM. For example, the GFKM of the system 214 is valid when the system 214 is on corporate premises and it is a normal working day between the hours of 7 a.m. and 6 p.m. and invalid otherwise. Additionally, or alternatively, if it has been more than a pre-defined time since a geo-location update message has been received, the GFKM of the system 214 is marked invalid. The pre-defined period of time will depend on the security requirements of the implementation, since the pre-defined period of time represents some measure of risk where the exact location of the system 214 is unknown. For example, in some embodiments 10 minutes may be a reasonable time. In a higher security environment, a shorter period of time may be desirable. In other embodiments, a longer period of time may be sufficient.

The description above assumes that the geo-fence evaluation (e.g., whether the system 214 is inside or outside the geo-fence) is evaluated by the geo-location update service 218. In other embodiments, it may be possible to delegate the geo-fence part of the evaluation to a different system. In some embodiments, the geo-location aware device 212 (and/or the combined system 214) performs the geo-fence evaluation. In other embodiments, the geo-fence evaluation may be delegated to a different system and/or service, such as the key management system 206 or any other system and/or service that is authorized. The identification of authorized delegates for this aspect (e.g., evaluation of the location of the system relative to the geo-fence) can be determined by a policy or combination of policies, which ultimately comply with the entity/entities that set the overriding policy, such as the authentication service 226, the centralized key management system 206 and/or validation/repudiation service 208. In embodiments where the geo-fence evaluation is performed by the system 214 (or the delegated geo-location aware system 212), the results of the evaluation are sent to the geo-location update service 218 via the geo-location update message 216. In further embodiments, the geo-location update message 216 also contains information that allows the geo-location update service 218 to verify the geo-fence evaluation and/or information that allows the geo-location update service 218 to trust the geo-fence evaluation.

The geo-location update message 216 is generally sent in a manner that prevents such security problems as a replay attack, man in the middle attack, and so forth. In some embodiments, a secure protocol is used to establish a secure, authenticated connection between the system 214 and the geo-location update service 218. A protocol such as TLS is a suitable choice. A more general approach is used in other embodiments. This more general approach relies on the encryption of the geo-location coordinates along with other information to resist such attacks, such as client and server generated nonce information. One suitable formulation is:

$$sgn_{prvC}(enc_{pubS}(GLI \oplus nonce_C \oplus nonce_S) \oplus nonce_C)$$

Where:
GLI is the geo-location information for the system sending updates (e.g., the system 214);
$nonce_C$ is a nonce generated by the system sending updates (e.g., the system 214);
$nonce_S$ is a nonce generated by the system receiving the updates (e.g., the geo-location update service 218);
pubS is a public key of the system receiving the updates (e.g., the geo-location update service 218);
prvC is a private key of the system sending the updates (e.g., the system 214);
$enc_x()$ is an asymmetric cryptographic algorithm (e.g., public/private key encryption scheme) where the key x is used to encrypt the data;
$sgn_x()$ is a signing algorithm where the key x is used to sign the data; and
$\oplus$ represents a concatenation.

The system 214 can use various triggering events to send a geo-location update message. Examples of suitable triggering events include, but are not limited to, a time period since the last update (e.g., messages are sent on a periodic basis), a change in location of the system 214, crossing the geo-fence, and/or combinations thereof. Thus in one embodiment, the system 214 sends a geo-location update message 216 whenever the system 214 crosses the geo-fence as well as at least every so many minutes (e.g., 10 minutes).

Once the geo-location update service 218 determines what the status of the GFKM associated with the system 214 should be, it can report the status to a validation/repudiation service, such as the validation/repudiation service 208. The validation/repudiation service 208 informs entities seeking to know the status of the GFKM whether the GFKM is valid or invalid. Such a service can be separate from, or part of, the key management system 206 as indicated by dashed box 210. In one embodiment, the key management system 206 operates as a repudiation service 208 to inform entities wishing to know the status of the GFKM whether it is valid or invalid.

When the system 214 wishes to establish authenticated communication with a system, such as the system 224, it initiates communication using an appropriate authentication protocol and at least the cryptographic key material. The system 224 checks the validity of the material using an authentication service 226. The authentication service 226 checks the validity of the material with the validation/repudiation service 208. Assuming everything checks out, the system 224 can establish the authenticated session(s) 222 based upon the cryptographic key material.

In some embodiments of FIG. 2, the authentication service 226 can be part of the system 224 as indicated by box 228. In some of these embodiments, the authentication service is that aspect of the system 224 that implements the authentication protocol or that works in conjunction with the aspect of the system 224 that implements the authentication protocol.

While the description above focused on the system 214 having a GFKM, whose validity is based at least in part on the location of the system 214 relative to a geo-fence, the same principles can be applied to the system 224. Thus, the system 224 may, in turn, have a GFKM whose validity depends, at least in part, on the location of the system 224. Thus, the system 224 would send geo-location updates to a geo-location update service such as geo-location update service 218 which would then determine the validity state of the associated GFKM. In this way, the system 214 can authenticate the system 224 (and/or the combined system 228) based on its GFKM as well to create a mutual authentication situation where both systems are authenticated, at least in part, based on the validity of their respective GFKMs.

Figure 3:
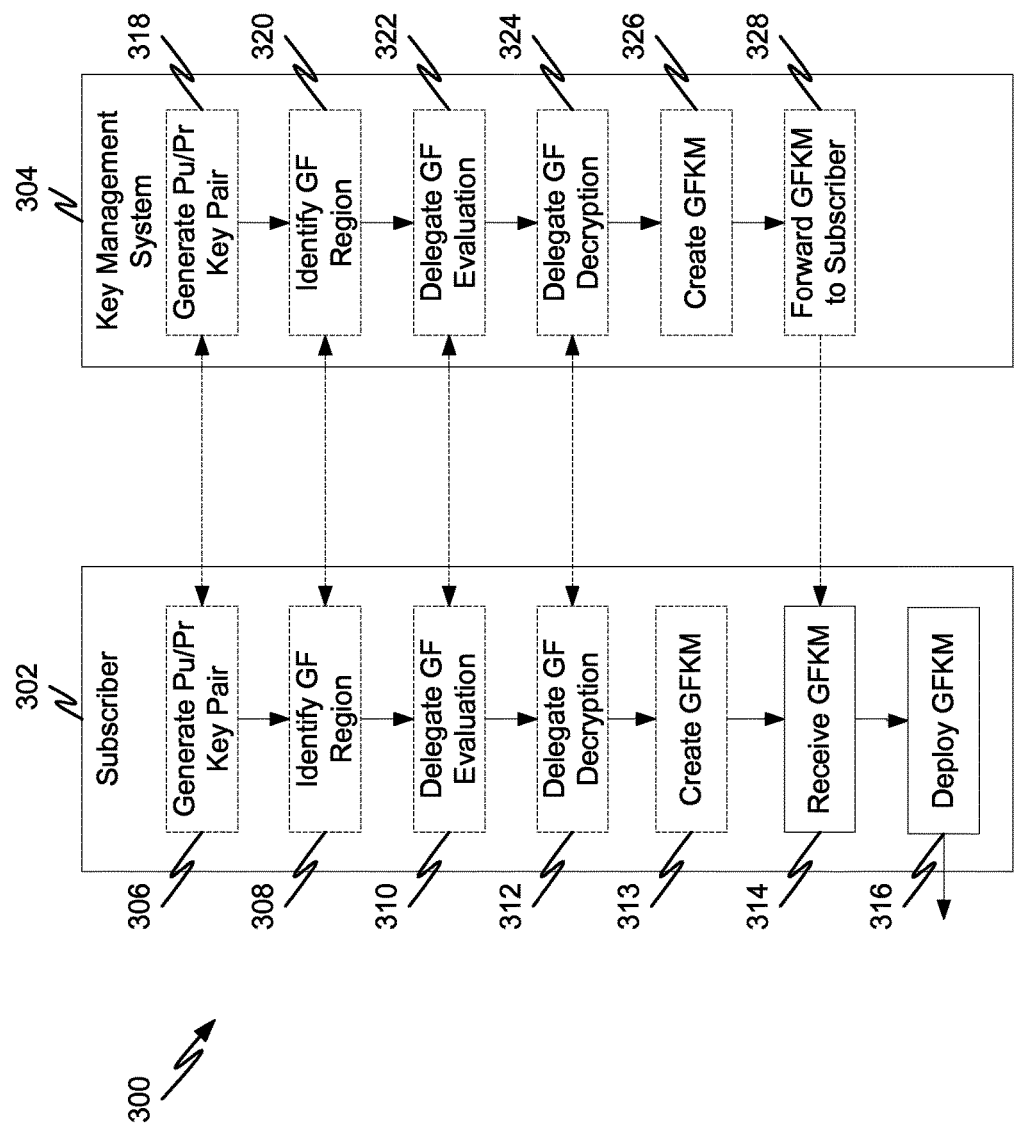
FIG. 3 illustrates a representative flow diagram between a subscriber and key management system in some embodiments.

FIG. 3 illustrates a representative flow diagram 300 between a subscriber 302 and key management system 304 in some embodiments. In order to create a key pair associated with an appropriate geo-fence/GFAS (e.g., GFKM). Appropriate delegations are determined and the GFKM is created and deployed appropriately. The diagram of FIG. 300 illustrates various options for these operations for various embodiments.

Operation 306 and/or operation 318 represent generating a public/private key pair for the GFKM. As discussed above, in some embodiments, the key pair would be generated on the subscriber system 302 (e.g., operation 306). In some embodiments, the key pair would be generated on the key management system 304 (e.g., operation 318). In still further embodiments, the process of generating the public/private key pair is split between the key management system 304 and the subscriber 302. In these latter embodiments, for example, the key management system 304 can access one or more policies to determine the appropriate key properties (e.g., key length, algorithm used to generate the key pair, and so forth), and the key management system 304 can initiate the appropriate key generation on the subscriber 302. Thus, information such as the "what" and "how" are determined by the key management system 304 while the actual key generation is performed by the subscriber 302. In still further embodiments, appropriate key properties are set by a combination of policies and/or by an administrator.

Operation 308 and/or operation 320 represent identifying an appropriate geo-fence for the GFKM. The geo-fence to be associated with a GFKM is determined by a policy and/or set of policies and/or other such information and/or some other way (e.g., set by an administrator). In some embodiments, the policy and/or policies and/or other information may be known by, or available to, the subscriber 302. In these embodiments, the appropriate geo-fence may be determined by the subscriber 302 (e.g., operation 308). In other embodiments, the policy and/or policies and/or other information may be known by, or available to, the key management system 304. In these embodiments, the appropriate geo-fence may be determined by the key management system 304 (e.g., operation 320). In still further embodiments, some combination thereof may be used.

Operation 310 and/or operation 322 represent delegation of geo-fence evaluation. As discussed in conjunction with the embodiment of FIG. 2, various embodiments may delegate the geo-fence evaluation to a geo-location aware device, to a geo-location update service, and/or some other system. In various embodiments, authorized delegates for this operation are identified by a policy, a set of policies, an administrator, or in some other fashion. Different embodiments select delegates based on policies (e.g., authorized delegates are identified by one or more policies), from a designated list, by a system administrator, based on some set of rules, and/or in some other fashion. Authorized delegate(s) are identified, for example, by a uniform resource locator (URL), a uniform resource identifier (URI), and/or some other identifier, and/or combinations thereof.

In some embodiments the subscriber 302 identifies the delegate(s) for the geo-fence evaluation (e.g., operation 310). In other embodiments, the key management system 304 identifies the delegate(s) for geo-fence evaluation (e.g., operation 322). In still further embodiments, a combination of the subscriber 302 and the key management system 304 identify the delegate(s) (e.g., both operation 310 and operation 322).

An obfuscation scheme such as encryption can be employed in some embodiments to conceal the geo-fence information. Such is useful, for example, if the information in the GFKM is public and there is a desire not to make the exact nature of the geo-fence public as well. In embodiments where the geo-fence information is encrypted, one or more delegates can be identified that are authorized to decrypt the encrypted geo-fence information. In various embodiments, authorized delegates for this operation are identified by a policy, a set of policies, an administrator, or in some other fashion. In some embodiment, this delegation identifies one or more entities that have access to appropriate keys and/or other information to accomplish decryption. The authorized delegate(s) are identified, for example, by a uniform resource locator (URL), a uniform resource identifier (URI), and/or some other identifier such as a key ownership identifier (e.g., as defined in RFC 5280), and/or combinations thereof which can be used to contact and/or connect with the delegate.

In certain embodiments the subscriber 302 identifies the delegate(s) for geo-fence decryption (e.g., operation 312). In other embodiments, the key management system 304 identifies the delegate(s) for geo-fence decryption (e.g., operation 324). In still further embodiments, a combination of the subscriber 302 and the key management system 304 identify the delegate(s) (e.g., both operation 312 and operation 324).

Not all of the information in operations 306/318, 308/320, 310/322, 312/324 need be identified for all embodiments. Some embodiments may have some, but not all of the identified information. Some embodiments may have more information. Still other embodiments may have some of the information identified in operations 306/318, 308/320, 310/322, 312/324, but have additional information not listed in these operations. In other words, the information listed in these operations is representative, but not exclusive. However, at a minimum, embodiments include the cryptographic key material as result of the operations 306/318 and the geo-fence information as a result of the operations 308/320.

Once all the information has been identified, a GFKM can be created (such as a GFC for systems that use certificates) and/or the information in the GFKM can be collected and stored in the appropriate location(s). This is indicated by operation 313 and/or operation 326 depending on whether an embodiment has the information on the subscriber 302, the key management system 304 or a combination thereof.

In operation 328, the key management system 304 forwards the GFKM over to the subscriber system 302. The information is received by the subscriber system 302 in operation 314 and the GFKM (or information thereof) is deployed and/or stored appropriately in operation 316.

Figure 4:
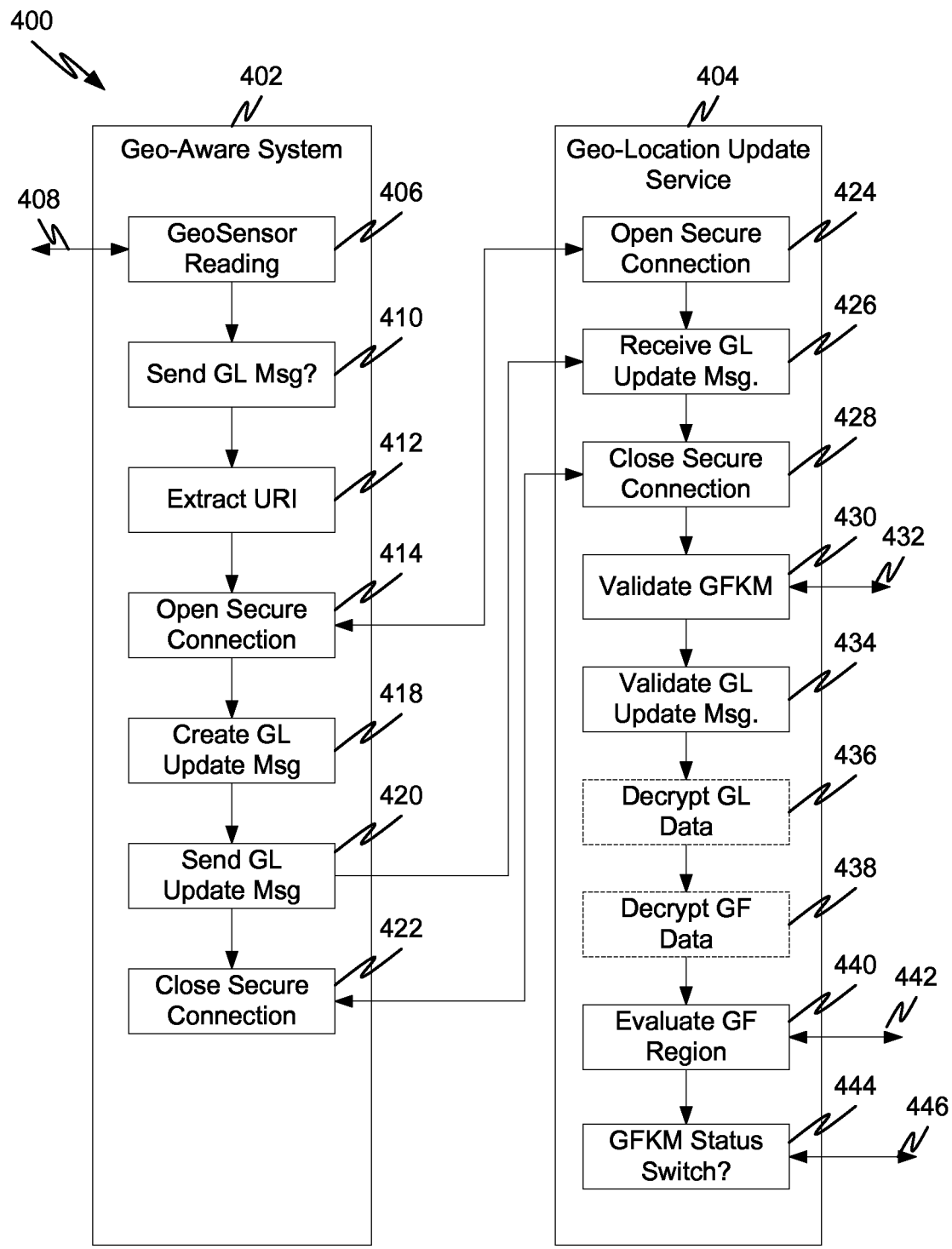
FIG. 4 illustrates a representative flow diagram between a geo-aware system and a geo-location update service in some embodiments.

FIG. 4 illustrates a representative flow diagram 400 between a geo-aware system 402 and a geo-location update service 404 in some embodiments. The geo-aware system 402 may be a system that has sensors and/or other means to determine its location (e.g., system 214 of FIG. 2 and/or system 616 of FIG. 6), or it may be a system that is a delegate for another system (e.g., system 212 of FIG. 2 and/or system 614 of FIG. 6). The geo-location update service 404 may be, for example, the geo-location update service 218 of FIG. 2 and/or the geo-location update service 620 of FIG. 6.

In operation 406, the geo-aware system 402 determines its location such as from a geo-location sensor or in some other fashion. Arrow 408 represents the retrieval of the location information and/or information from which the geo-aware system 402 can determine its location. In some embodiments, a geo-location can be retrieved from a sensor that is in proximity to the system, such as a mobile phone.

Operation 410 identifies whether to send a geo-location update message, such as when a triggering event has occurred. Triggering events can include, but are not limited to, crossing the geo-fence, the passage of a designated period of time since the last geo-location update message, or some other triggering event. Thus, operation 406 and 410 may be done in reverse order if desired (e.g., the geo-aware system 402 may not retrieve/calculate its location until a triggering event occurs). Furthermore, if crossing the geo-fence is used as a triggering event, operation 410 may access the geo-fence as part of the decision to send the geo-location update message.

In operation 412 the geo-aware system 402 identifies where to send the geo-location update message. In some embodiments, GFKM will store a URI or other identifier for the geo-location update service where geo-location update messages should be sent. Operation 412 represents the system accessing such information to identify where to send the message.

As discussed above, the geo-location update messages may be sent in a manner that prevents tampering or that prevents attacks such as the man in the middle attack or a replay attack. Mechanisms to transfer messages in this way have been discussed elsewhere. Any of these mechanisms can be used, but for purposes of illustration, operation 414 shows a secure connection opened between geo-aware system 402 and geo-location update service 404. This operation represents any manner to transfer the message in a way that provides sufficient security to meet the goals of the embodiment. One suitable option for many embodiments is TLS. Corresponding operation 424 on geo-location update service 404 illustrates the actions taken by geo-location update service 404 to open the secure connection.

Operation 418 represents constructing the geo-location update message, and operation 420 represents sending the message to the geo-location update service 404. As discussed, the contents of the geo-location update message vary from embodiment to embodiment. However, all will contain sufficient information to allow the geo-location update service to evaluate the location of the system 402 relative to the geo-fence. Corresponding operation 426 illustrates receipt of the message by the geo-location update service 404.

Operation 422 and operation 428 represent closing the secure connection.

Once the geo-location update service 404 has received the geo-location update message, the service can perform the geo-fence evaluation to determine whether the geo-aware system 402 is inside or outside the geo-fence. Based on that evaluation, the validity state of the GFKM can be set appropriately. This can be accomplished in several different ways. One way to accomplish this is to check the existing status of the GFKM, perform the evaluation and if the state should be changed, institute a change in the validity state of the GFKM. Another way is not to check the validity state of the GFKM, but to simply perform the evaluation, determine the appropriate state for the GFKM and initiate an update to the GFKM state. In this latter case, a state change may be initiated even though the validity of the GFKM is in accord with the results of the geo-fence evaluation.

In FIG. 4, the validity state of the GFKM is checked in operation 430. This operation can be performed by accessing the appropriate state if it is available to the geo-location update service 404 or, if not, the validity of the GFKM can be determined using an appropriate service, such as the validation/repudiation service 208 of FIG. 2 and/or the service 610 of FIG. 6. Contacting such a service is illustrated by arrow 432.

Operation 434 checks the validity of the geo-location update message. Such an operation may be desirable to ensure that the message has not been tampered with or ensure that it has no other problems.

If the message is encrypted, operation 436 decrypts the message. The geo-location update service 404 can decrypt the message if it has access to the appropriate key(s) and if it is an approved delegate. If not, the geo-location update service 404 utilizes an authorized delegate to decrypt the message.

If the geo-location or geo-fence data is encrypted, the data is decrypted in operations 436 and/or 438, respectively. The geo-location update service 404 can decrypt the message if it has access to the appropriate key(s). If not, it uses an authorized delegate to decrypt the message.

Operation 440 illustrates performing the geo-fence evaluation to determine whether the geo-aware system 402 is inside or outside the defined region. In appropriate embodiments, all or part of this operation can be delegated as indicated by arrow 442. For example, if the computation of the geo-location of the system relative to the geo-fence is too complex or if delegation is appropriate to decrypt encrypted information. Finally operation 444 indicates that the geo-location update service 404 initiates a change in the validity of the GFKM if necessary based on its evaluation and based on other information as explained elsewhere in this disclosure as indicated by arrow 446. What information is used in evaluating whether a state change is initiated depends on the embodiment. Examples have been discussed above and another example is discussed below in conjunction with FIG. 11.

Figure 5:
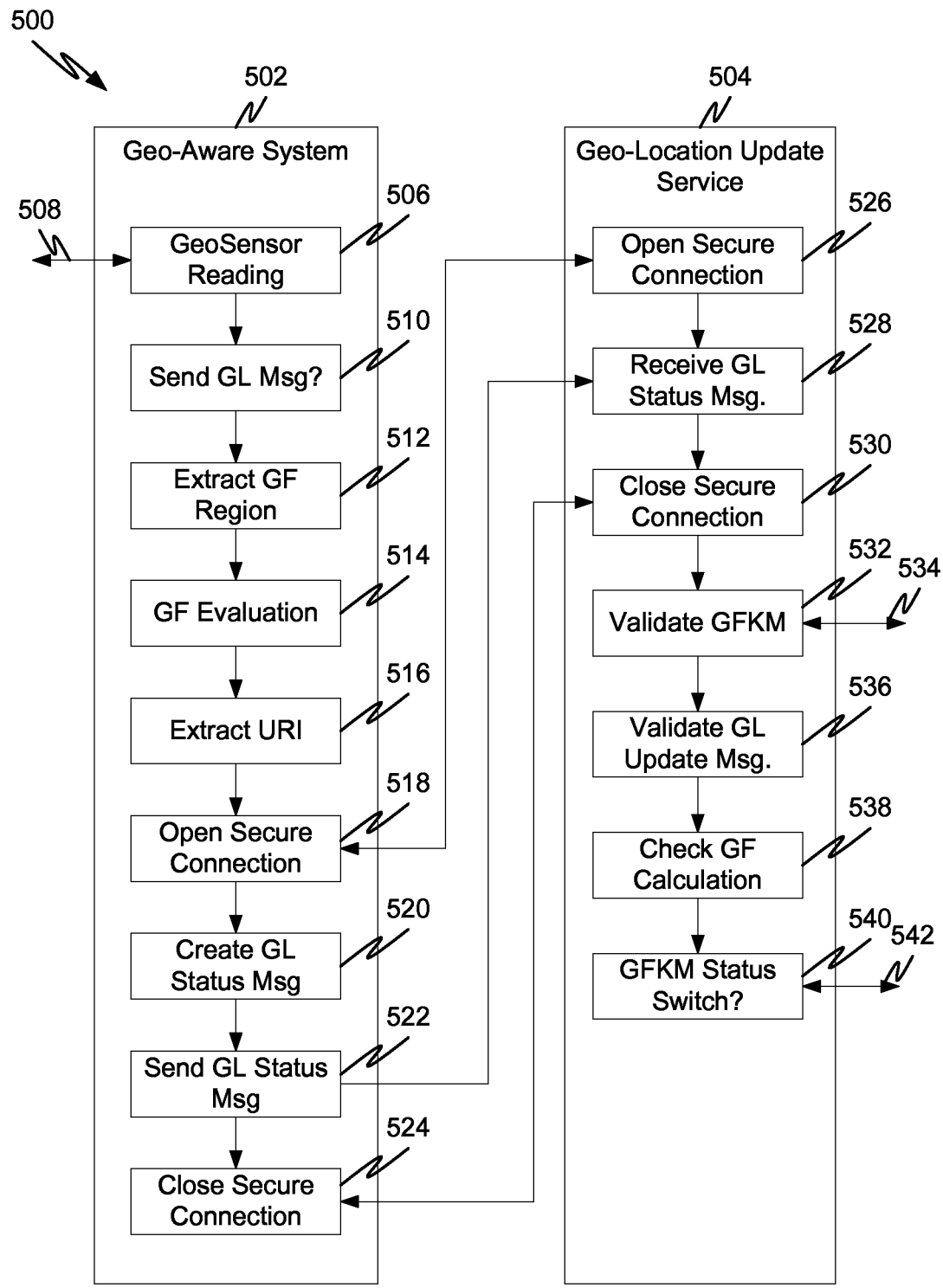
FIG. 5 illustrates a representative flow diagram between a geo-aware system and a geo-location update service in some embodiments.

FIG. 5 illustrates a representative flow diagram 500 between a geo-aware system 502 and a geo-location update service 504 in some embodiments. In this embodiment, the geo-aware system performs the geo-fence evaluation itself and transfers the results of the evaluation. In some embodiments, the geo-aware system 502 also sends information that allows the geo-location update service 504 to check the calculation or otherwise verify the results are authentic. The geo-aware system 502 may be a system that has sensors and/or other means to determine its location (e.g., system 214 of FIG. 2 and/or system 616 of FIG. 6), or it may be a system that is a delegate for another system (e.g., system 212 of FIG. 2 and/or system 614 of FIG. 6). The geo-location update service 504 may be, for example, the geo-location update service 218 of FIG. 2 and/or the geo-location update service 620 of FIG. 6.

In operation 506, the geo-aware system 502 determines its location such as from a geo-location sensor or in some other fashion. Arrow 508 represents the retrieval of the location information and/or information from which the geo-aware system 502 can determine its location. In some embodiments, a geo-location can be retrieved from a sensor that is in proximity to the system, such as a mobile phone.

Operation 510 identifies whether to send a geo-location update message, such as when a triggering event has occurred. Triggering events can include, but are not limited to, crossing the geo-fence, the passage of a designated period of time since the last geo-location update message, or some other triggering event. Thus, operation 506 and 510 may be done in reverse order if desired (e.g., the geo-aware system 502 may not retrieve/calculate its location until a triggering event occurs). Furthermore, if crossing the geo-fence is used as a triggering event, operation 512 may be performed as part of the decision to send the geo-location update message.

In operation 512, geo-location aware system 502 accesses the geo-fence in order to be able to determine where it is with respect to the geo-fence. The geo-fence evaluation is illustrated in operation 514. This evaluation determines whether the geo-aware system 502 resides within or outside of the region defined by the geo-fence. In this embodiment, the geo-aware system 502 does not perform the entire task of determining what the validity status of its own GFKM should be. It only performs the evaluation relative to the geo-fence.

In operation 516 the geo-aware system 502 identifies where to send the geo-location status message. In some embodiments, GFKM will store a URI or other identifier for the geo-location update service where geo-location status messages should be sent. Operation 516 represents the system accessing such information to identify where to send the message.

As discussed above, the geo-location update messages may be sent in a manner that prevents tampering or that prevents attacks such as the man in the middle attack or a replay attack. Mechanisms to transfer messages in this way have been discussed above. Any of these mechanisms can be used, but for purposes of illustration, operation 518 shows a secure connection opened between geo-aware system 502 and geo-location update service 504. This operation represents any manner to transfer the message in a way that provides sufficient security to meet the goals of the embodiment. One suitable option for many embodiments is TLS. Corresponding operation 526 on geo-location update service 504 illustrates the actions taken by geo-location update service 504 to open the secure connection.

Operation 520 represents constructing the geo-location status message, and operation 522 represents sending the message to the geo-location update service 504. The contents of the geo-location status message vary from embodiment to embodiment. However, all will contain sufficient information to allow the geo-location update service to determine whether the geo-aware system 502 is inside or outside the geo-fence. In some embodiments, additional information allowing geo-location update service 504 to validate the geo-fence evaluation performed by geo-aware system 502 is also included. Corresponding operation 528 illustrates receipt of the message by the geo-location update service 504.

Operation 524 and operation 530 represent closing the secure connection.

Once the geo-location update service 504 has received the geo-location status message, the service can determine the proper state of the GFKM and set it appropriately. As discussed with FIG. 4, this can be accomplished in several different ways. One way to accomplish this is to check the existing status of the GFKM, perform the evaluation and if the state should be changed, institute a change in the validity state of the GFKM. Another way is not to check the validity state of the GFKM, but to simply perform the evaluation, determine the appropriate state for the GFKM and initiate an update to the GFKM state. In this latter case, a state change may be initiated even though the validity of the GFKM is in accord with the results of the geo-fence evaluation.

In FIG. 5, the validity state of the GFKM is checked in operation 532. This operation can be performed by accessing the appropriate state if it is available to the geo-location update service 504 or, if not, the validity of the GFKM can be determined using an appropriate service, such as the validation/repudiation service 208 of FIG. 2 and/or service 610 of FIG. 6. Contacting such a service is illustrated by arrow 534.

Although not depicted in FIG. 5, if the geo-location status message is encrypted or any of the data included in the geo-location status message is encrypted, decryption can be performed as described previously. Delegation of the decryption can also occur in some embodiments.

Operation 536 checks the validity of the geo-location status message. Such an operation may be desirable to ensure that the message has not been tampered with or ensure that it has no other problems.

If the message contains information that allows the geo-location update service 504 to check the geo-fence evaluation performed by the geo-aware system 502, the check is performed in operation 538. Such a check may take the form of verifying proof material associated with the calculation, verifying the identity of the system that performed the calculation, checking signature data, recalculating the geo-fence evaluation, or any other such checks or verification.

Finally operation 540 and arrow 542 indicates that the geo-location update service 504 initiates a change in the validity of the GFKM if necessary. What information is used in evaluating whether a state change is initiated depends on the embodiment. Examples have been discussed above and another example is discussed below in conjunction with FIG. 11.

Figure 6:
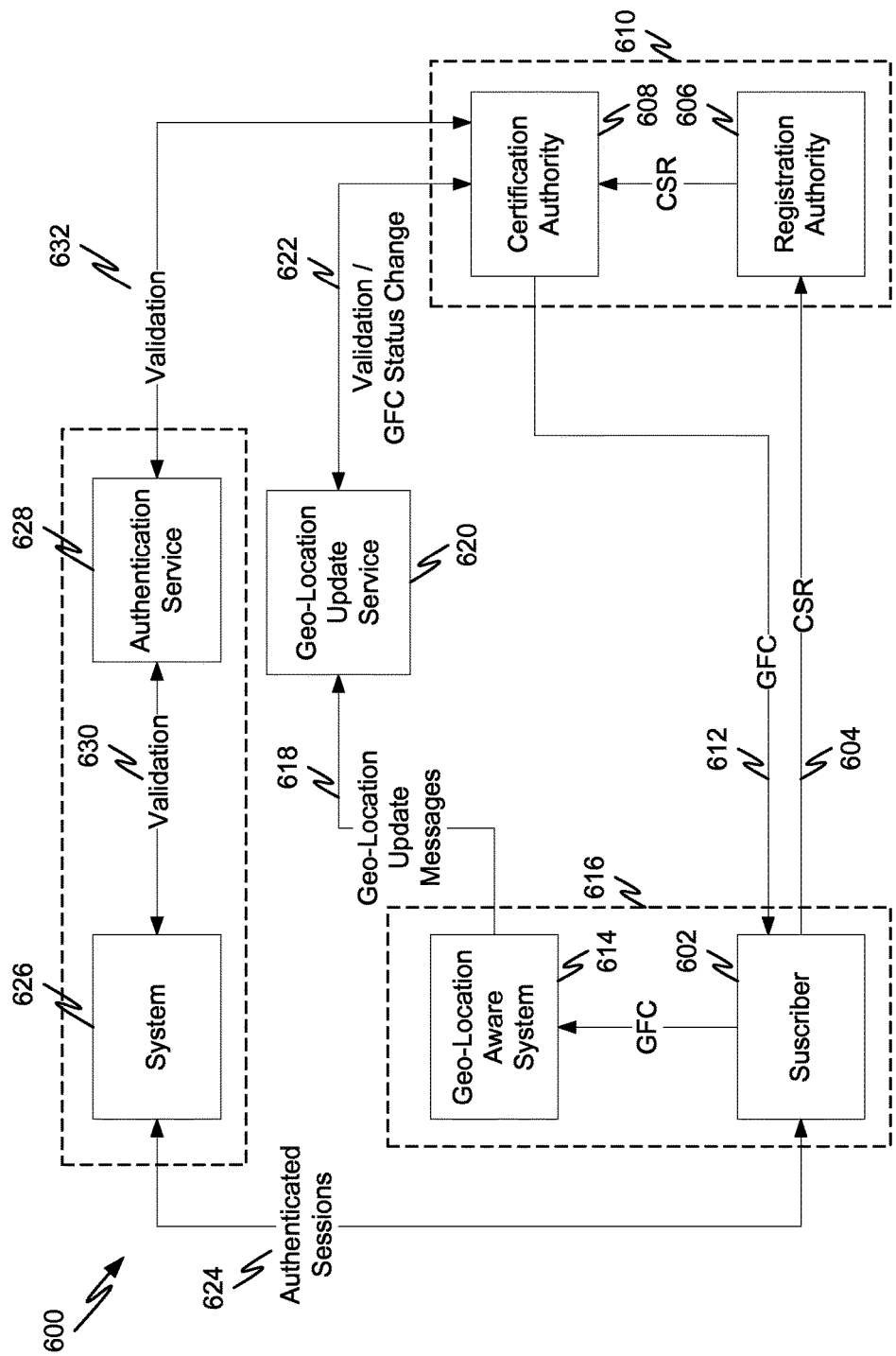
FIG. 6 illustrates representative system interactions to issue and utilize geo-fenced certificates.

FIG. 6 illustrates representative system interactions 600 to issue and utilize geo-fenced certificates according to one embodiment. Such an embodiment is useful, for example, if an X.509 certificate forms the basis for the GFC. Thus, the GFKM are GFCs in this embodiment. The associated PKI can for the basis for issuing and validating GFC, and other purposes as described below. The interactions are similar, although not necessarily identical, to those discussed in conjunction with FIG. 2 above and many of the same considerations apply.

In this embodiment, a subscriber 602 obtains appropriate cryptographic key material by creating a private/public key pair and embedding the public key into a certificate signing request (CSR) and sending the CSR 604 to an appropriate registration authority 606. In some embodiments, the geo-fence information is included as part of the CSR. In other embodiments, the geo-fence information is provided by another entity and embedded in the GFC by the certification authority as described below.

While some subscribers are geo-location aware, meaning that they have sensors or other means to determine the geo-location of the subscriber, other subscribers are not. Thus, in some embodiments, aspects related to geo-location can be delegated to a geo-location aware system/device 614. For example, the subscriber may be a user account located on a laptop without geo-location sensors (e.g., global positioning sensor (GPS), accelerometers, and so forth) while the geo-location aware device may be the user's mobile phone, which has the ability to determine its geo-location.

Delegation may be accomplished via a real-time authorization protocol between the geo-location aware system 614 and the subscriber 602 based on a short distance protocol such as low power Bluetooth or a near-field communication. Delegation may also be accomplished using a static authorization assignment, for example the appropriate policy may allow a user to use her specified mobile phone as the geo-location aware device. Thus, in some embodiments delegation uses static or pre-authorized delegation to a device or system. In other embodiments, dynamic delegation is used. In still further embodiments, both static and dynamic delegation is used. In all of these embodiments, communications between the subscriber 602 and the geo-location aware system 614 may be wireless such as over low power Bluetooth or near field communication so that delegation only occurs when the two systems are in close proximity to each other. In other embodiments wired connections can be used.

Whether delegation can occur, the conditions under which delegation can occur, the mechanism used for delegation, the authorized entities that can be delegated to and so forth may be controlled by policies or in some other way. Policies can also be hierarchical in nature so that "lower" level policies can be overridden by "higher" level policies. For example, the user can authorize delegation, but the company can limit or override the authorization consistent with its security goals and infrastructure. Thus, in some embodiments some management entity (e.g., certificate management system, administrator, and so forth) plays a role in determining authorized delegates, related conditions and/or mechanisms. In other embodiments, the subscriber 602 plays a role in determining authorized delegates, related conditions and/or mechanisms. In still further embodiments, a combination plays a role in determining authorized delegates, related conditions and/or mechanisms.

Dashed box 616 indicates that the subscriber 602 and the geo-location aware system 614 may be the same system, device, or so forth. From this point on, the description of FIG. 6 will refer to system 616 as a unit, rather than trying to differentiate embodiments where the subscriber 602 and/or the geo-location aware system 614 perform various actions. However, it will be clear to one of ordinary skill in the art how to apply this description to embodiments where delegation of geo-location functions to the geo-location aware system 614 occurs.

In some embodiments, additional information (in addition to the geo-fence information described above) included in the CSR can include, but is not limited to identifiers and other information related to delegates (e.g., geo-location aware system 614, systems that are authorized to decrypt and/or validate encrypted information, etc.), policy information that describes conditions for GFC state change, and so forth. As with the geo-fence information, this information may be provided by another entity and made part of the GFC as described below. In summary, a CSR may include one or more of the following in any combination:

1) geo-fence information;
2) delegate identifier(s) and/or other delegate information for things like delegation of decryption of various items, delegation of geo-location determination, service where geo-location update messages should be sent, delegation of verification/validation of various items, and so forth;
3) policy information;
4) key instance(s) and/or identifier(s) of associated cryptographic key material (e.g., some way to indicate the related cryptographic key material); and/or
5) other information.

This information may also be part of the issued GFC.

When the CSR is received by registration authority 606, the registration authority validates/verifies the CSR and, in some embodiments, the information included in the CSR. For example, the registration authority 606 can vet the subscriber's claim for the issuance of the GFC. If the subscriber is not authorized to submit a CSR for the GFC it desires, the CSR can be rejected. The certification authority can also check for the applicability of any templates and/or template information applicable to the CSR. If possible, the registration authority 606 also validates/verifies the other information in the CSR such as any of the information listed above.

Templates and template information are used in some embodiments to provide any or all of the information in the CSR. As an example, an administrator determines that a subscriber from a particular department submitting a CSR has a pre-defined geo-fence around one or more designated geographic regions, such as the locations where the department has operations. A template can provide this geo-fence information for all CSRs created by subscribers from that department. Thus, the geo-fence information is provided by an authorized entity and the registration authority 606 uses templates to enforce and simplify the process. In some embodiments, rules and/or policies can determine what the registration authority 606 does with conflicting and/or inconsistent and/or additional information coming from the subscriber 602 and/or the template.

Once the certification authority 606 finishes validating the CSR and/or the information in the CSR, as well as utilizing any applicable templates and/or template information, the registration authority 606 forwards the CSR to the certification authority 608.

The certification authority 608 issues the GFC according to its policies and applies any templates and/or template information. The certification authority 608 can also embed the URI and/or other identifier for the geo-location update service that should receive geo-location update messages. The certification authority can also encrypt the GFAS part of the certificate and/or specific information therein like the geo-fence information.

The dashed box 610 indicates that citification authority 608 and registration authority 606 may be the same system in some embodiments. Thus, a reference to a combined system (e.g., the system 610) should be taken in this disclosure to also be a reference to the particular individual system (e.g., the certification authority 608 or the registration authority 606) as appropriate.

The geo-location update service 620 ascertains when to change the validity status of the GFC associated with the system 616. As described elsewhere, determining the proper validity status of the GFC associated with the system 616 involves an assessment of the location of the system 616 relative to the geo-fence. Also as described elsewhere, in some embodiments, determining the proper validity status of the GFC associated with the system 616 also involves other information such as the time since the location of the system 616 has been determined and/or other policy information. The geo-fence evaluation is performed by different entities, depending on the embodiment. In some embodiments, the geo-fence evaluation can be performed by the geo-location update service 620. In other embodiments, the geo-fence evaluation can be performed by the system 616. In other embodiments, the geo-fence evaluation can be performed by other entities.

In some embodiments, upon a triggering event, the location of the system 616 is passed to a geo-location update service 620 so that an assessment of the location of the system 616 relative to the geo-fence can be ascertained. The location updates are indicated in the embodiment of FIG. 6 by geo-location update message 618. The purpose of the geo-location update service 620 is to determine when to set the status of the GFC as valid and when to set the status of the GFC as not valid based on the location of the system 616 and other relevant information. The information in the geo-location update message 618 is sufficient to allow proper assessment of the conditions relevant to this determination when coupled with information the geo-location update service 620 has access to by other means. Thus, in some embodiments all the relevant information is sent via the geo-location update message. In other embodiments some information is sent via the geo-location update message and other information is either known locally or access remotely or a combination thereof. A typical embodiment includes the location of the system 616 as well as relevant geo-fence information in the geo-location update message. Such can be determined, for example, by sending the GFC in the geo-location update message 618 along with the location of the system 616. Different embodiments include either more or less information, such as the information outlined below.

In one representative embodiment, in order to ascertain what the status of the GFC should be, the geo-location update service 620 accesses the location of the system 616, the geo-fence data associated with the GFC, and/or other information that may also be used to determine the validity of the GFC. Such other information may be defined in one or more policies and contain things like a schedule (e.g., time of day, day of week, and so forth), the length of time since the last geo-location update message, or any other desired information. Using the information, the geo-location update service 620 can apply various methods to determine whether to change the validity status of the GFC. For example, the GFC of the system 616 is valid when the system 616 is at an authorized remote location (defined by the geo-fence information) and it is not a holiday and the time is between 7 p.m. and 10 p.m. and invalid when the system 616 is otherwise not located on the corporate campus. Thus, a rich set of rules and conditions, which can be different for different geo-fence locations, can be applied to the validity status of the GFC. Additionally, or alternatively, if it has been more than a pre-defined time (e.g., 10 minutes or other time appropriate to the security environment) since a geo-location update message has been received, the GFC of the system 616 is marked invalid.

The description above assumes that the geo-fence evaluation (e.g., whether the system 616 is inside or outside the geo-fence) is evaluated by the geo-location update service 620. In other embodiments, it may be possible to delegate the geo-fence part of the evaluation to a different system. In some embodiments, the geo-location aware device 614 (and/or the combined system 616) performs the geo-fence evaluation. In other embodiments, the geo-fence evaluation may be delegated to a different authorized system and/or service. The identification of authorized delegates for this aspect (e.g., evaluation of the location of the system relative to the geo-fence) can be determined by a policy or combination of policies. Furthermore, delegation can be conditional and based on factors such as proximity to a geo-aware device/system, location of the system associated with the GFC, time of day, connectivity, and/or other information. In embodiments where the geo-fence evaluation is performed by the system 616 (or the delegated geo-location aware system 614), the results of the evaluation are sent to the geo-location update service 620 via the geo-location update message 618. In further embodiments, the geo-location update message 618 also contains information that allows the geo-location update service 620 to verify the geo-fence evaluation and/or information that allows the geo-location update service 620 to trust the geo-fence evaluation.

The geo-location update message 618 is generally sent in a manner that prevents such security problems as a replay attack, man in the middle attack, and so forth. In some embodiments, a secure protocol is used to establish a secure, authenticated connection between the system 616 and the geo-location update service 620. A protocol such as TLS is a suitable choice. A more general approach is used in other embodiments. This more general approach relies on the encryption of the geo-location coordinates along with other information to resist such attacks, such as client and server generated nonce information. One suitable formulation is:

$$sgn_{prvC}(enc_{pubS}(GLI \oplus nonce_C \oplus nonce_S) \oplus nonce_C)$$

Where:
GLI is the geo-location information for the system sending updates (e.g., the system 214);
$nonce_C$ is a nonce generated by the system sending updates (e.g., the system 214);
$nonce_S$ is a nonce generated by the system receiving the updates (e.g., the geo-location update service 218);
pubS is a public key of the system receiving the updates (e.g., the geo-location update service 218);
prvC is a private key of the system sending the updates (e.g., the system 214);
$enc_x(\ )$ is an asymmetric cryptographic algorithm (e.g., public/private key encryption scheme) where the key x is used to encrypt the data;
$sgn_x(\ )$ is a signing algorithm where the key x is used to sign the data; and
$\oplus$ represents a concatenation.

The system 616 can use various triggering events to know when to send a geo-location update message. Examples of suitable triggering events include, but are not limited to, a time period since the last update (e.g., messages are sent on a periodic basis), a change in location of the system 616, crossing the geo-fence, and/or combinations thereof. Thus in one embodiment, the system 616 sends a geo-location update message 618 whenever the system 616 crosses the geo-fence as well as at least every so many minutes (e.g., 10 minutes).

Once the geo-location update service 620 determines what the status of the GFC associated with the system 618 should be, it can report the status to a validation/repudiation service, such as certification authority 610. The certification authority 610 informs entities seeking to know the status of the GFC whether the GFC is valid or invalid. Initiating a status change in the context of PKI can be accomplished in several ways. The PKI uses certificate revocation lists (CRL) and Delta CRLs to track certificates that have been revoked and are no longer valid. One mechanism that some embodiments use is to revoke the status of GFCs that are no longer valid. When the system, such as system 616 moves to a geo-location where the GFC can be reinstated, a process could be started to issue a new GFC to the system. This embodiment can increase the overall complexity of the implementation due to the need to generate a new key pair and issue a new certificate every time the certificate should be reinstated.

Another embodiment utilizes the ability of the PKI to indicate why a specific certificate has been revoked. A certificate can be temporarily suspended by assigning the reason code certificateHold. Once listed as a revoked certificate in a published CRL, the corresponding certificate will be repudiated by relying parties until either a subsequently published CRL removes the certificate's serial number from its list of revoked certificates or—if applicable—a Delta CRL marks the certificate's entry with the reason code removeFromCRL. Thus, in this embodiment, the geo-location update service would initiate a validity status change to invalid by indicating the relevant GFC should be revoked and attaching the certificateHold reason code. The revoked certificate would then be included in the CRL with the attached certificateHold reason code. When the certificate should be reinstated, the geo-location update service would initiate a change to remove the certificate from the CRL or—if applicable—a Delta CRL marks the certificate's entry with the reason code removeFromCRL.

When the system 616 wishes to establish authenticated communication with a system, such as the system 626, it initiates communication using an appropriate authentication protocol (e.g., TLS) using the X.509 certificate with the GFC information. The system 626 checks the validity of the material using an authentication service 628 as indicated by arrow 630. The authentication service 628 checks the validity of the material by checking CRL, Delta CRL and/or by querying an online certificate status protocol (OCSP) responder. This is illustrated in FIG. 6 by validation 632 which queries certification authority 608 and/or PKI 610. Assuming everything checks out, the system 626 can establish the authenticated session(s) 624 based upon the cryptographic key material.

In some embodiments of FIG. 6, the authentication service 628 can be part of the system 626 as indicated by the dashed box surrounding them. In some of these embodiments, the authentication service is that aspect of the system 626 that implements the authentication protocol or that works in conjunction with the aspect of the system 626 that implements the authentication protocol.

While the description above focused on the system 616 having a GFC, whose validity is based at least in part on the location of the system 616 relative to a geo-fence, the same principles can be applied to the system 626. Thus, the system 626 may, in turn, have a GFC whose validity depends, at least in part, on the location of the system 626. Thus, the system 626 would send geo-location updates to a geo-location update service such as geo-location update service 620 which would then determine the validity state of the associated GFC. In this way, the system 616 can authenticate the system 626 (and/or the combined system 626 and authentication service 628) based on its GFC as well to create a mutual authentication situation where both systems are authenticated, at least in part, based on the validity of their respective GFCs.

Figure 7:
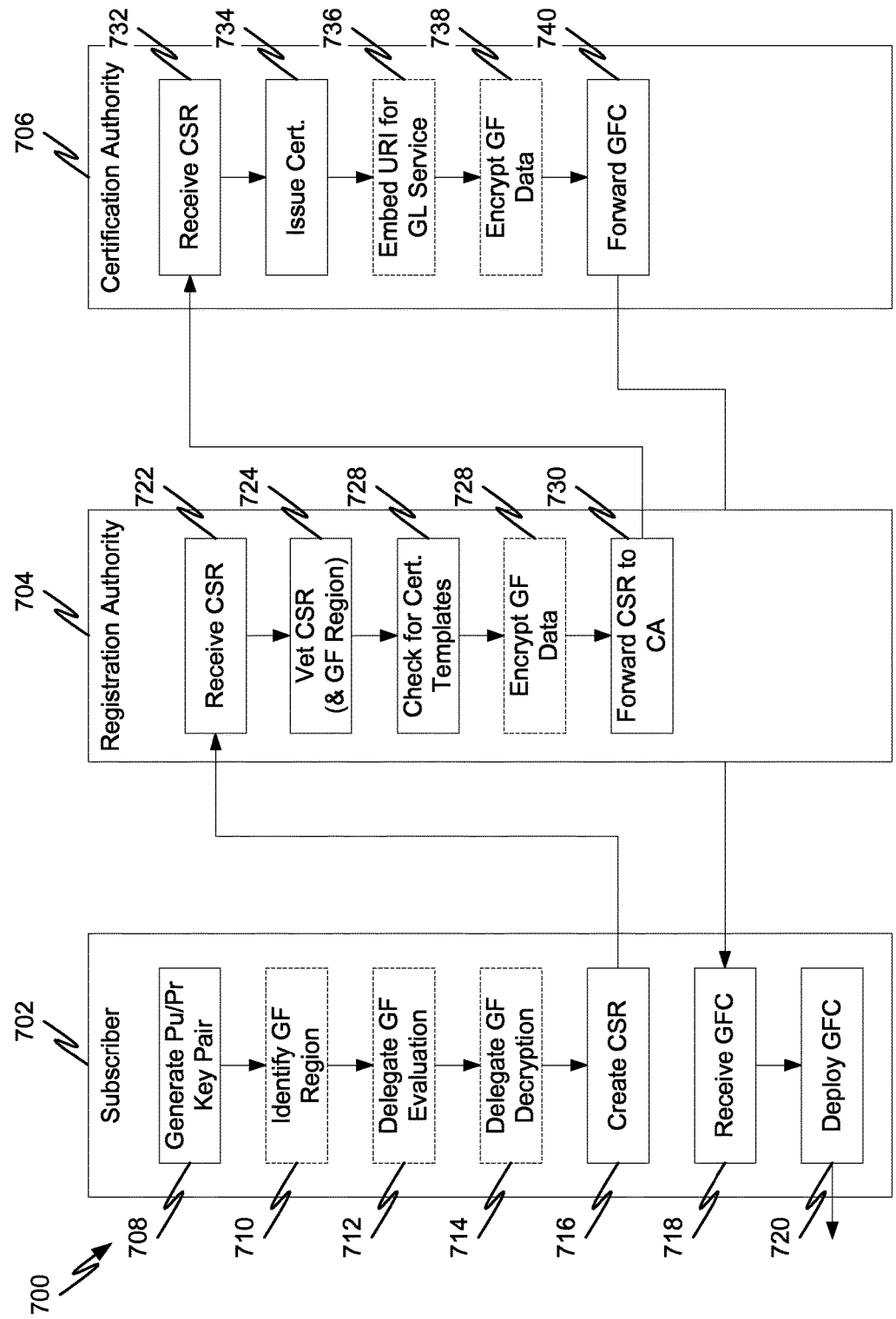
FIG. 7 illustrates a representative flow diagram between a subscriber, a registration authority and a certification authority.

FIG. 7 illustrates a representative flow diagram 700 between a subscriber 702, a registration authority 704 and a certification authority 706, such as those illustrated in FIG. 6.

Operation 708 represents generating a public/private key pair for the GFC. In some embodiments, the key pair would be generated on the subscriber system 702 (e.g., operation 708). In some embodiments, a policy or other system (e.g., a certificate or credential management system) would either generate the key pair or would initiate generation of the key pair on the subscriber system 702 with appropriate options and in an appropriate manner to ensure the key pair complies with one or more policies. In other words, a certificate/credential management system can access one or more policies to determine the appropriate key properties (e.g., key length, algorithm used to generate the key pair, and so forth), and can initiate the appropriate key generation on the subscriber 702. In other embodiments, the subscriber system 702 has access to one or more policies, information from administrators, or can access the appropriate key properties so that it will generate a key pair that complies with all relevant security requirements.

Operation 710 represents identifying an appropriate geo-fence for the GFC. The geo-fence to be associated with a GFC is determined by a policy and/or set of policies and/or other such information and/or some other way (e.g., set by an administrator). In some embodiments, the policy and/or policies and/or other information may be known by, or available to, the subscriber 702. In these embodiments, the appropriate geo-fence may be determined by the subscriber 702 (e.g., operation 710). In other embodiments, the policy and/or policies and/or other information may be known by, or available to, some sort of certificate/credential management system. In these embodiments, the appropriate geo-fence may be determined by that system and retrieved by the subscriber 702. Still further embodiments use templates and/or template information as described in FIG. 6 to identify an appropriate geo-fence for the certificate. In these embodiments, registration authority 704 and/or certification authority 706 will supply the geo-fence information.

Operation 712 represents delegation of geo-fence evaluation. As discussed in conjunction with the embodiment of FIGS. 2 and 6, various embodiments may delegate the geo-fence evaluation to a geo-location aware device, to a geo-location update service, and/or some other system. Different embodiments select delegates based on policies (e.g., authorized delegates are identified by one or more policies), from a designated list, by a system administrator, based on some set of rules, and/or in some other fashion. Authorized delegate(s) are identified, for example, by a uniform resource locator (URL), a uniform resource identifier (URI), and/or some other identifier, and/or combinations thereof.

In some embodiments the subscriber 702 identifies the delegate(s) for the geo-fence evaluation (e.g., operation 712). In other embodiments, another system identifies the delegate(s) for geo-fence evaluation and subscriber 712 retrieves the appropriate information. In still further embodiments, the registration authority 704 and/or the certification authority 706 provide the information via templates and/or template information as explained elsewhere.

An obfuscation scheme such as encryption can be employed in some embodiments to conceal the geo-fence information. Such is useful, for example, if the information in the GFC is public and there is a desire not to make the exact nature of the geo-fence public as well. In embodiments where the geo-fence information is encrypted, one or more delegates can be identified that are authorized to decrypt the encrypted geo-fence information. In various embodiments, authorized delegates for this operation are identified by a policy, a set of policies, an administrator, or in some other fashion. In some embodiment, this delegation identifies one or more entities that have access to appropriate keys and/or other information to accomplish decryption. The authorized delegate(s) are identified, for example, by a uniform resource locator (URL), a uniform resource identifier (URI), and/or some other identifier such as a key ownership identifier (e.g., as defined in RFC 5280), and/or combinations thereof which can be used to contact and/or connect with the delegate.

In certain embodiments the subscriber 702 identifies the delegate(s) for geo-fence decryption (e.g., operation 714). In other embodiments, another system identifies the delegate(s) for geo-fence decryption and the subscriber 702 retrieves the relevant information. In still further embodiments, the registration authority 704 and/or the certification authority 706 provide the information via templates and/or template information as explained elsewhere.

Not all of the information in operations 710, 712 and 714 need be identified for all embodiments. Some embodiments may have some, but not all of the identified information. Some embodiments may have more information. Still other embodiments may have some of the information identified in operations 710, 712 and 714 but have additional information not listed in these operations. In other words, the information listed in these operations is representative, but not exclusive. However, at a minimum, embodiments include the cryptographic key information as result of the operation 708 and the geo-fence information as a result of the operation 710. If templates are employed, in addition to or instead of a geo-fence region supplied by the subscriber, a geo-fence may be determined by the template.

Once all the information has been identified, a CSR for the GFC can be created and sent to the registration authority 704 as indicated by operations 716 and 722.

Once the registration authority 704 receives the CSR, the registration authority 704 verifies the information that it can verify in operation 724. This includes, but is not limited to, verifying the CSR itself along with the geo-fence information and other information in the CSR.

In operation 728 the registration authority 704 checks for templates and/or template information that should be utilized as part of the CSR. The use of templates and/or template information has been previously explained.

If the geo-fence information is to be encrypted and if the geo-fence information is not already encrypted, the registration authority 704 may encrypt the information in operation 728. The use of encryption to obscure the geo-fence information has been previously discussed.

Once the registration authority 704 has verified all information, added information from templates, and/or encrypted the data necessary, the registration authority 704 forwards the CSR to the certification authority 706 as indicated in operations 730 and 732.

The certification authority 706 that receives the CSR issues the GFC (such as an X.509 certificate with embedded GFAS information) according to its policies and procedures in operation 734. The certification authority 706 can also optionally embed the URI for the geo-location update service that should be used with the certificate in operation 736. Also optionally, the certification authority 706 can encrypt the geo-fence information as indicated in operation 738 to the extent that the information is not already encrypted.

Once the GFC is created, the certification authority 706 forwards the GFC to the subscriber 702 as indicated by operations 740 and 718. The subscriber 702 then deploys the GFC as appropriate (e.g., to a delegate).

Figure 8:
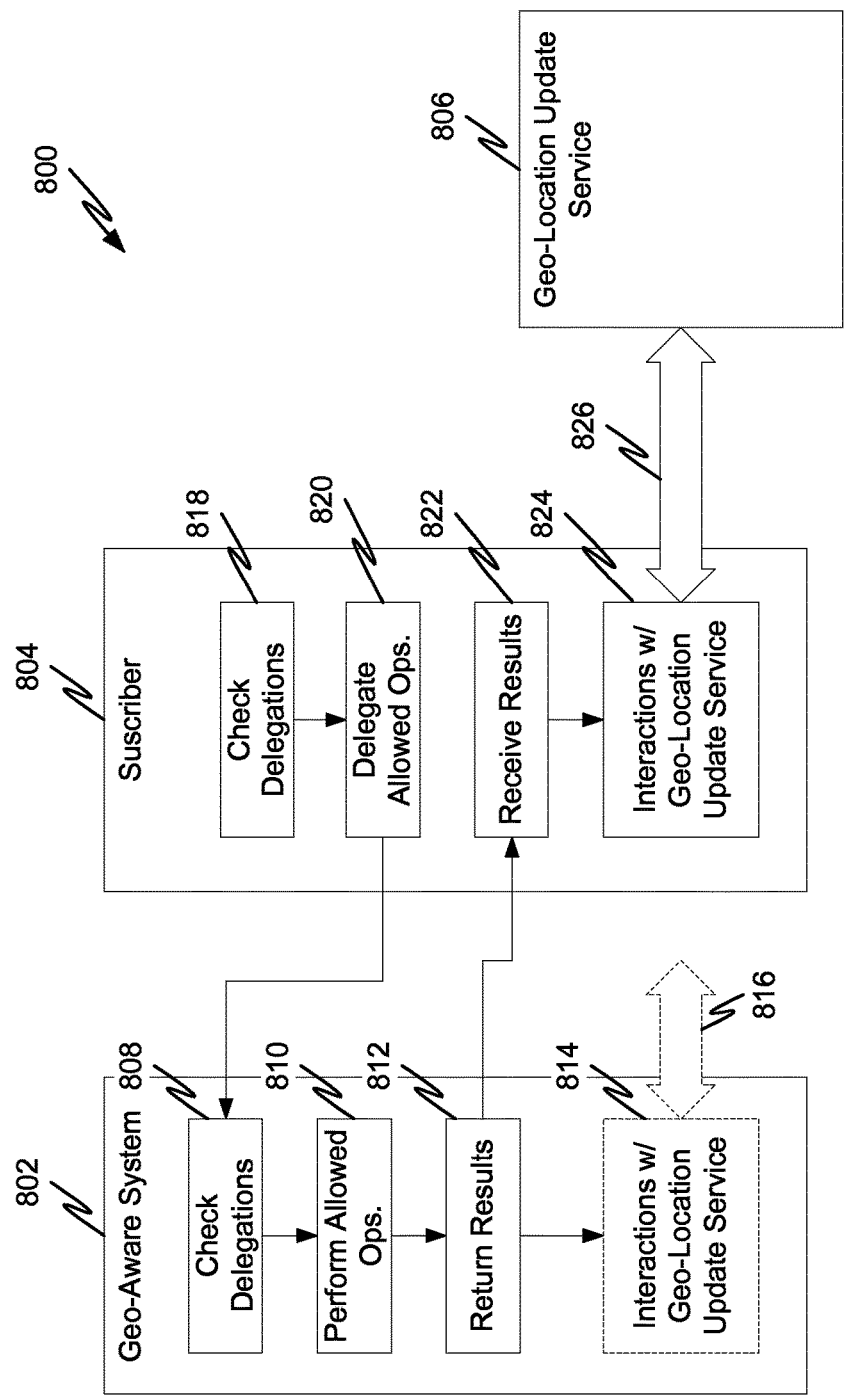
FIG. 8 illustrates a representative flow diagram between a geo-aware system, a subscriber and a geo-location update service in some embodiments.

FIG. 8 illustrates a representative flow diagram 800 between a geo-aware system 802, a subscriber 804 and a geo-location update service 806 in some embodiments. This diagram is intended to illustrate an example embodiment of a subscriber 804 working with a geo-aware system 802 that has been delegated certain operations (e.g., such as the operations discussed in conjunction with the subscribers of FIGS. 2, 3, 6 and 7). In most, if not all, embodiments, any operation that would be performed by a geo-aware subscriber can be delegated to a geo-aware system working with a subscriber as a delegate. However, some operations will more naturally be performed at one and/or the other in the situation where a non-geo-aware subscriber works with a geo-aware system as a delegate. As discussed elsewhere, a geo-aware delegate working with a non-geo-aware subscriber can communicate and/or establish the delegation using a static delegation or some form of short-range protocol and/or technology such as a wired connection, low power Bluetooth, near-field communication and such. The purpose of using these type of connections, protocols, and technologies is to help ensure that the device that is geo-aware is in close proximity to the device that is not geo-aware. Otherwise, it may be possible to report incorrect location information for the non-geo-aware subscriber.

The subscriber 804 checks its delegations in operation 818. This operation identifies the whether an operation should be delegated and, if so, which entity it should be delegated to. Operation 820 establishes the delegation with the appropriate geo-aware system 802. As explained elsewhere, the delegation can be dynamic based on proximity and/or other information of the delegate to the subscriber 804, or the delegation can be static (e.g., established before hand). In the static case, certain information and/or characteristics can be checked before the delegate is actually allowed to perform the action (such as checking for proximity of the delegate, for example).

Operation 808 checks the delegation and ensures the geo-aware system 802 is capable of carrying out the delegated operation, that the proper system is requesting the operation, and so forth. Operation 810 illustrates the geo-aware system 802 performing the delegated operations and the results are returned in operation 812.

Once the results are received (e.g., operation 822), the subscriber 804 can forward the results or, for example, create a geo-location update or status message and send to the geo-location update service 806 as indicated in operation 824. Alternatively, or additionally, interactions with the geo-location update service 806 can be performed by the geo-aware system 802 as indicated by operation 814 and arrow 816.

Figure 9:
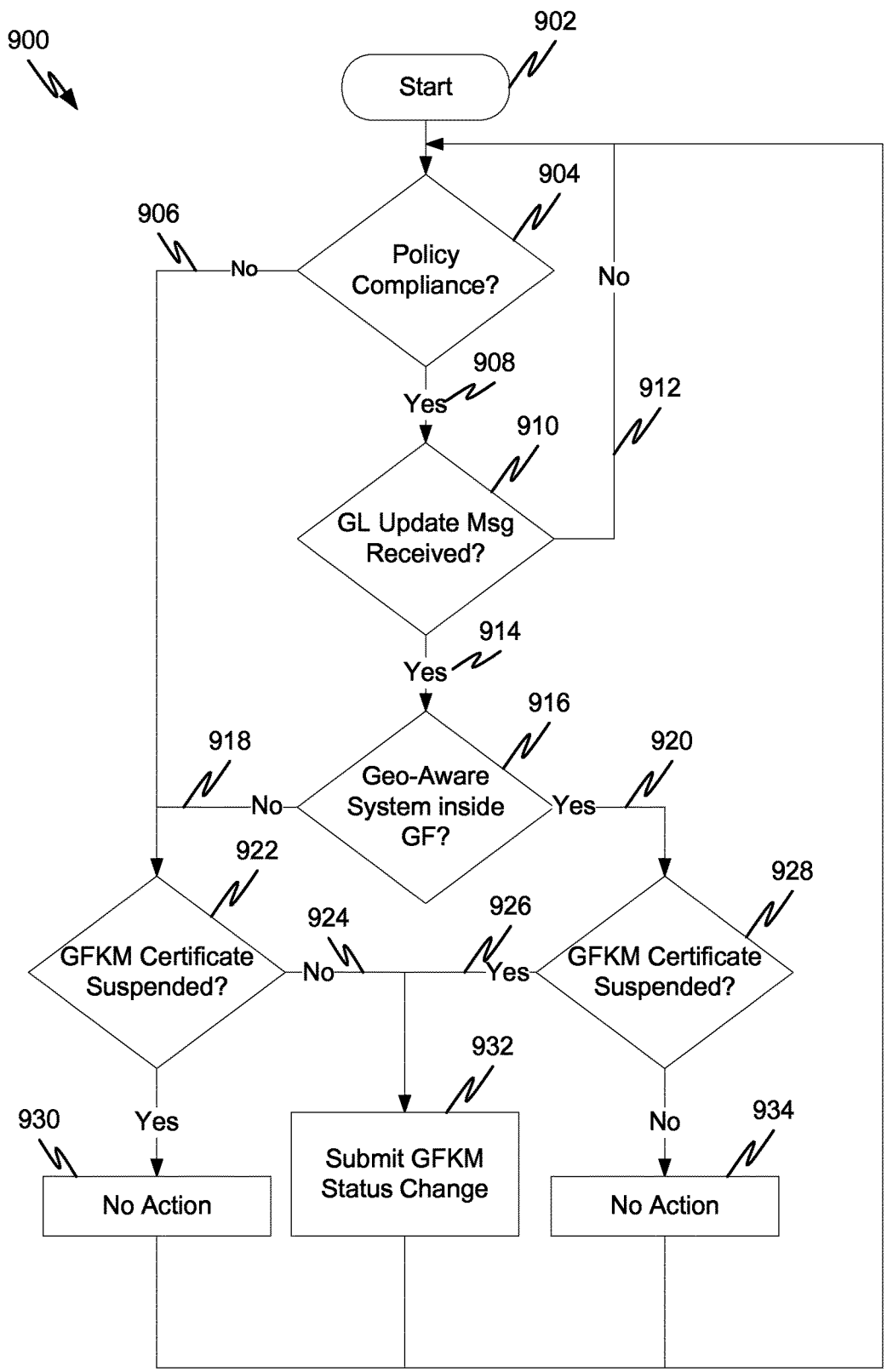
FIG. 9 illustrates a representative flow diagram for policy compliance.

FIG. 9 illustrates a representative flow diagram 900 for policy compliance based on any desire factor and/or rules. Examples of factors and/or rules that can be checked for policy compliance are a schedule, such as time of day, day of week and so forth, a time period since the last update was received, or any other factors and/or rules to perform complex logic for the validity of the GFKM. No attempt has been made in FIG. 9 to separate out functions that are performed by one system vs. a system and a delegate, such as those embodiments described above. However, certain functions can be delegated as previously described such as geo-fence evaluation.

The method starts at 902 and proceeds to operation 904, which tests for policy compliance. For example, if the policy states that the cryptographic material is valid for authentication during working hours, then the policy compliance operation 904 would test whether it is currently during working hours. As another example, if the policy stated that the certificate was valid during weekends as long as the geo-location has been checked in the last 4 minutes, then operation 904 would check these conditions. If the system is not in compliance with policy, the status of the GFKM should be set to invalid. Thus, execution proceeds to operation 922 where the validity status of the GFKM is checked. If the GFKM certificate is already suspended (e.g., invalid), no action needs to be taken as indicated by operation 930. If the GFKM certificate is valid, the no branch 924 is taken and the status of the GFKM is changed to invalid as indicated in operation 932.

If the system is in compliance with policy, execution proceeds to operation 910, which waits until an update message is received. Thus, the combination of operations 904 and 910 wait until either the system is not in compliance with policy or until an update message is received.

When a geo-location update message is received, execution proceeds to operation 916. In operation 916 the location of the geo-aware system is checked against the geo-fence. Thus, operation 916 checks the geo-fence aspect of any policies. Assuming a policy where a GFKM is valid inside the geo-fence and invalid outside it, if it is inside the geo-fence, then the GFKM should be indicated as valid. Execution thus proceeds to operation 928 and if the GFKM is already valid, no action is taken as indicated by operation 934. If, however, the GFKM is suspended, execution proceeds to operation 932 and the status of the GFKM is changed to reinstated.

When the geo-aware system is outside the geo-fence, the GFKM should be marked as suspended. Thus, the "no" branch 918 is taken out of operation 916 and the validity of the GFKM is checked in operation 922. If the GFKM is already suspended, no action is taken as indicated by operation 930. If, however, the certificate is valid, execution proceeds to operation 932 and the status of the GFKM is changed to suspended.

Figure 10:
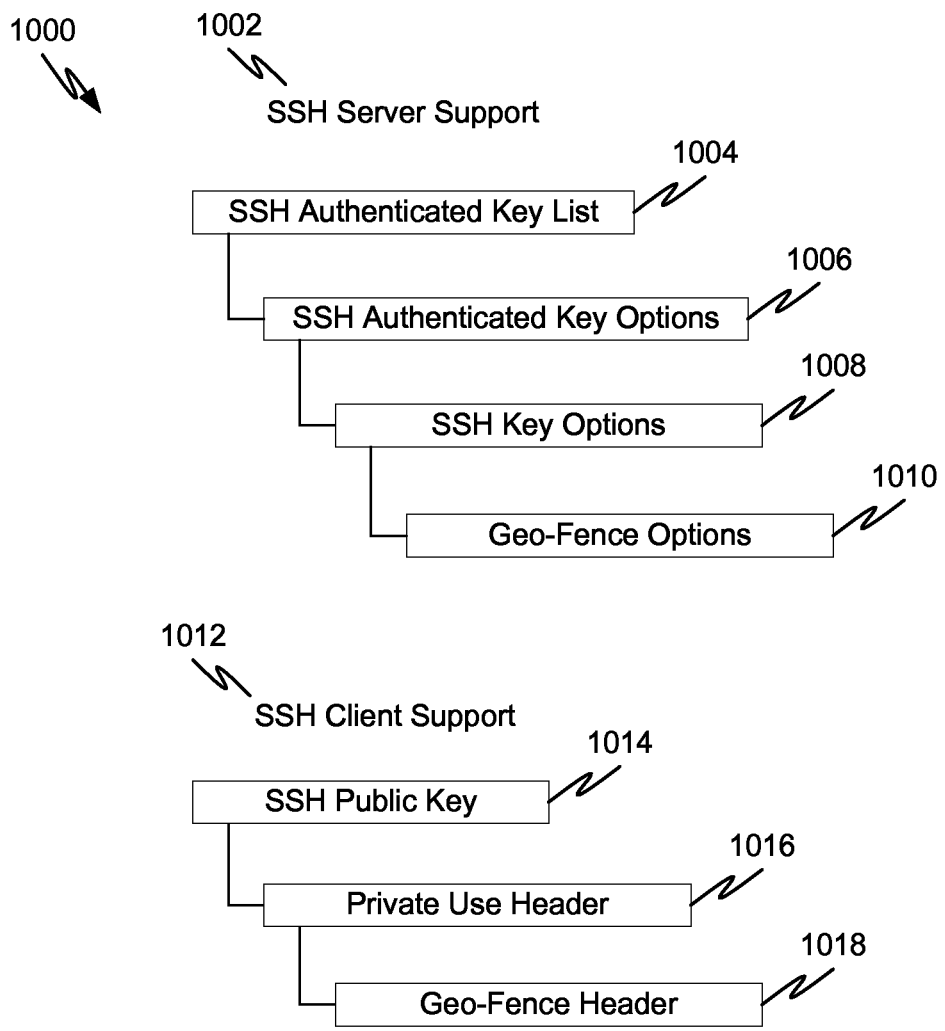
FIG. 10 illustrates a representative SSH client and server support for a geo-fence attribute set.

FIG. 10 illustrates a representative SSH client 1012 and server 1002 support 1000 for GFKM. As previously mentioned, SSH does not use certificates as such in most implementations. However, cryptographic key material is the basis for authenticated communications and such cryptographic key material can be associated with a GFAS in order to form GFKM. In addition to cryptographic key material (e.g., various key instances), many SSH implementations have additional key options and other information that serve many of the same purposes as information in other certificate implementations such as key expiry, periodic key rotation, selecting key parameters/options to comply with various security concerns, and so forth.

In the definitions section, a client is the system, user, device, account, and so forth that initiates a secure connection, such as when a secure connection request is sent, while a server is the system, host, device, account, and so forth that receives a secure connection request (e.g., from a client). Systems (or other entities) can act as both a client and a server and systems can have multiple clients and/or servers on them. Thus, the information used to support a GFKM implementation can vary for clients and servers and from implementation to implementation. The illustration of FIG. 10 is meant to be a representative illustration and other embodiments can have different implementations and/or different information and/or store the same information in a different manner.

Returning for a moment to the discussion of FIG. 2, the system 214 used the GFKM information to establish an authenticated session 222 with the system 224. In this fashion, the system 214 functions as a client and the system 224 functions as a server. Looking at the described operation, the system 214 sends a geo-location update message to geo-location update service 218 in order to allow the validity status of the GFKM material to be properly determined. The server, however, needs the cryptographic key material used to establish the authenticated session as well as a way to determine how to contact the validation/repudiation service to determine the validity status of the GFKM related information. Thus, as explained in conjunction with the embodiment of FIG. 2, the GFKM related information may include one or more of the following information:

1) geo-fence information;
2) delegate identifier(s) and/or other delegate information for things like delegation of decryption of various items, delegation of geo-location determination, service where geo-location update messages should be sent, delegation of verification/validation of various items, and so forth;
3) policy information;
4) key instance(s) and/or identifier(s) of associated cryptographic key material (e.g., some way to indicate the related cryptographic key material); and/or
5) other information.

Most, if not all, SSH implementations support various key file headers in the SSH key file. These headers include, for example, a subject header, a comment header, and private use headers; the latter are reserved for private use. Thus, SSH client support 1012 in some embodiments are implemented by storing the GFAS or client subset thereof in geo-fence header 1018 stored as a private use header 1016 section in the key file 1014. Thus, geo-fence header 1018 represents the GFAS or client subset thereof. The GFAS or client subset thereof is those geo-fence attributes used by the client in authenticated communications.

The SSH server support 1002 in some embodiments stores its GFAS or server subset thereof as SSH key options. Thus, the SSH server support 1002 has an SSH key list storing client information (e.g., authenticated keys) 1004 with various key options 1006 including SSH key options 1008 for the particular client key. A section of the client key options 1008 can include the relevant GFAS stored as geo-fence options 1010.

Figure 12:
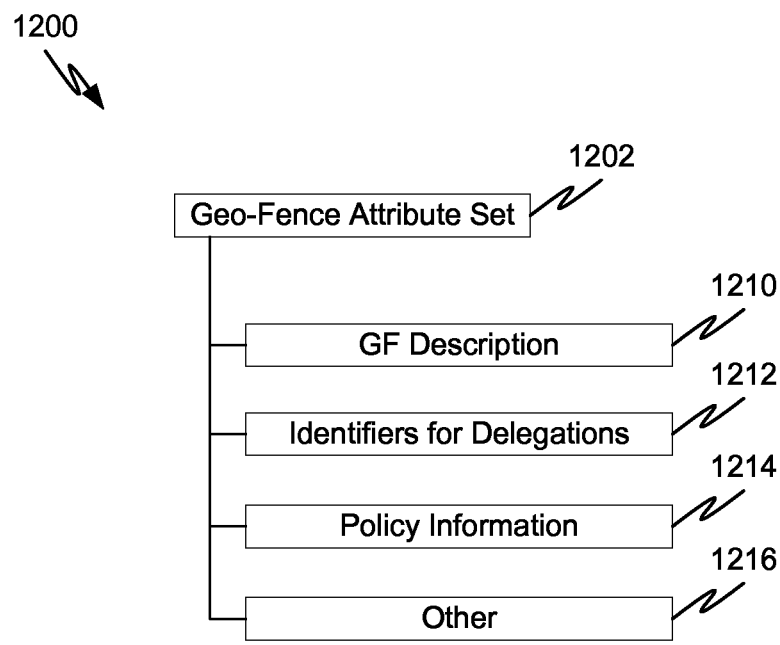
FIG. 12 illustrates a representative geo-fence attribute set.

A representative GFAS is illustrated in FIG. 12.

Figure 11:
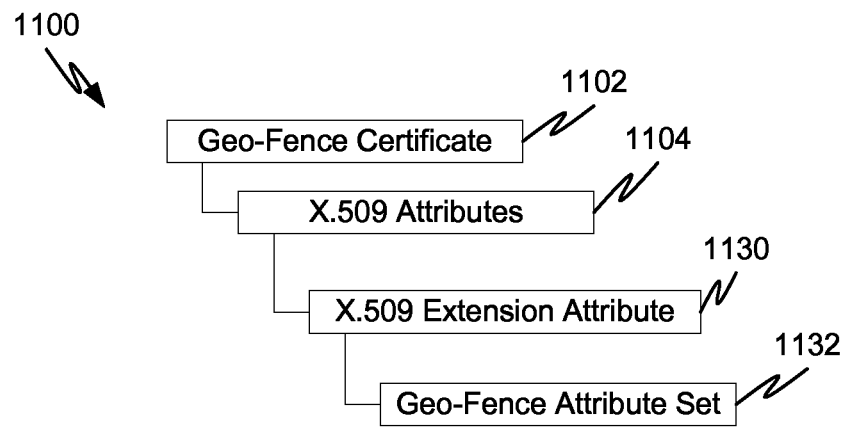
FIG. 11 illustrates a representative mechanism to embed a geo-fence attribute set in an X.509 certificate.

FIG. 11 illustrates a representative mechanism to embed a relevant GFAS 1132 in an X.509 certificate, shown generally as 1100. An X.509 certificate 1102 comprises numerous attributes 1104 that are defined in specifications, such as RFC 5280. One mechanism to associate GFAS 1132 with and/or embed GFAS 1132 in an X.509 certificate 1102 is to use the X.509 extension attribute 1130, which is available starting with version 3 of the X.509 certificates. As indicated in RFC 5280, the extensions defined for X.509 v3 certificates provide methods for associating additional attributes with users or public keys and for managing relationships between certification authorities. The X.509 v3 certificate format also allows communities to define private extensions to carry information unique to those communities. Each extension in a certificate is designated as either critical or non-critical. The GFAS 1132 is placed in this area of the X.509 certificate in many embodiments. A representative embodiment describing the contents of the GFAS 1132 is described in FIG. 12, below.

FIG. 12 illustrates a representative GFAS, shown generally as 1200. The GFAS 1202 can include various attributes, not all of which need be used in every embodiment. The representative GFAS 1202 of FIG. 12 can be associated with cryptographic key material to produce GFKM, such as used with an SSH embodiment (e.g., stored in the SSH public key file to which the GFAS is attached to, referenced by the authorized key list of the SSH server the GFAS is embedded in, or otherwise) or with an embodiment using GFC (e.g., an X.509 certificate plus GFAS such as that illustrated in FIG. 11). All embodiments will, at a minimum, have the geo-fence description attribute 1210. As the GFAS is associated with cryptographic key material to form GFKM, many embodiments include some mechanism of indicating the cryptographic key material that is associated with the GFAS. Such a mechanism can be internal to the GFAS/GFKM like an identifier, associated certificate, and/or other mechanism, or external to the GFAS/GFKM such as GFAS/GFKM metadata and/or some other mechanism.

Representative attributes for a GFAS include, but are not limited to the following.

1) A geo-fence description attribute 1210, which describes one or more geo-fence area(s). The geo-fence description can be described in absolute coordinates or be described in a relative fashion, either using coordinates or a landmark (e.g., within a particular building, within a certain area relative to a fixed coordinate or landmark, and so forth).

2) One or more identifiers for delegates 1212 (or some way of identifying appropriate delegates). Identifiers for delegates have been described elsewhere. If there are no delegates, this attribute can be omitted.

3) A policy attribute 1214, which describes one or more policies associated with the GFKM. Policies and what they may contain have been described extensively elsewhere. This attribute can be omitted if no additional policies apply.

4) other information and/or attributes 1216.

Some embodiments also include some way of identifying associated cryptographic key material. This can be an identifier, link, and/or some other mechanism.

Modules, Components and Logic

Certain embodiments are described herein as including logic or a number of components, modules, or mechanisms. Modules may constitute either software modules (e.g., code embodied (1) on a non-transitory machine-readable medium or (2) in a transmission signal) or hardware-implemented modules. A hardware-implemented module is tangible unit capable of performing certain operations and may be configured or arranged in a certain manner. In example embodiments, one or more computer systems (e.g., a standalone, client or server computer system) or one or more processors may be configured by software (e.g., an application or application portion) as a hardware-implemented module that operates to perform certain operations as described herein.

In various embodiments, a hardware-implemented module may be implemented mechanically or electronically. For example, a hardware-implemented module may comprise dedicated circuitry or logic that is permanently configured (e.g., as a special-purpose processor, such as a field programmable gate array (FPGA) or an application-specific integrated circuit (ASIC)) to perform certain operations. A hardware-implemented module may also comprise programmable logic or circuitry (e.g., as encompassed within a general-purpose processor or other programmable processor) that is temporarily configured by software to perform certain operations. It will be appreciated that the decision to implement a hardware-implemented module mechanically, in dedicated and permanently configured circuitry, or in temporarily configured circuitry (e.g., configured by software) may be driven by cost and time considerations.

Accordingly, the term "hardware-implemented module" should be understood to encompass a tangible entity, be that an entity that is physically constructed, permanently configured (e.g., hardwired) or temporarily or transitorily configured (e.g., programmed) to operate in a certain manner and/or to perform certain operations described herein. Considering embodiments in which hardware-implemented modules are temporarily configured (e.g., programmed), each of the hardware-implemented modules need not be configured or instantiated at any one instance in time. For example, where the hardware-implemented modules comprise a general-purpose processor configured using software, the general-purpose processor may be configured as respective different hardware-implemented modules at different times. Software may accordingly configure a processor, for example, to constitute a particular hardware-implemented module at one instance of time and to constitute a different hardware-implemented module at a different instance of time.

Hardware-implemented modules can provide information to, and receive information from, other hardware-implemented modules. Accordingly, the described hardware-implemented modules may be regarded as being communicatively coupled. Where multiple of such hardware-implemented modules exist contemporaneously, communications may be achieved through signal transmission (e.g., over appropriate circuits and buses) that connect the hardware-implemented modules. In embodiments in which multiple hardware-implemented modules are configured or instantiated at different times, communications between such hardware-implemented modules may be achieved, for example, through the storage and retrieval of information in memory structures to which the multiple hardware-implemented modules have access. For example, one hardware-implemented module may perform an operation, and store the output of that operation in a memory device to which it is communicatively coupled. A further hardware-implemented module may then, at a later time, access the memory device to retrieve and process the stored output. Hardware-implemented modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein are at least partially processor-implemented. For example, at least some of the operations of a method may be performed by one or more processors or processor-implemented modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., application program interfaces (APIs).)

Electronic Apparatus and System

Example embodiments may be implemented in digital electronic circuitry, or in computer hardware, firmware, software, or in combinations of them. Example embodiments may be implemented using a computer program product, e.g., a computer program tangibly embodied in an information carrier, e.g., in a machine-readable medium for execution by, or to control the operation of, data processing apparatus, e.g., a programmable processor, a computer, or multiple computers.

A computer program can be written in any form of programming language, including compiled or interpreted languages, and it can be deployed in any form, including as a stand-alone program or as a module, subroutine, or other unit suitable for use in a computing environment. A computer program can be deployed to be executed on one computer or on multiple computers at one site or distributed across multiple sites and interconnected by a communication network.

In example embodiments, operations may be performed by one or more programmable processors executing a computer program to perform functions by operating on input data and generating output. Method operations can also be performed by, and apparatus of example embodiments may be implemented as, special purpose logic circuitry, e.g., a field programmable gate array (FPGA) or an application-specific integrated circuit (ASIC).

The computing system can include clients and servers. A client and server are generally remote from each other and typically interact through a communication network. The relationship of client and server arises by virtue of computer programs running on the respective computers and having a client-server relationship to each other. In embodiments deploying a programmable computing system, it will be appreciated that that both hardware and software architectures may be employed. Specifically, it will be appreciated that the choice of whether to implement certain functionality in permanently configured hardware (e.g., an ASIC), in temporarily configured hardware (e.g., a combination of software and a programmable processor), or a combination of permanently and temporarily configured hardware may be a design choice. Below are set out hardware (e.g., machine) and software architectures that may be deployed, in various example embodiments.

Example Machine Architecture and Machine-Readable Medium

Figure 13:
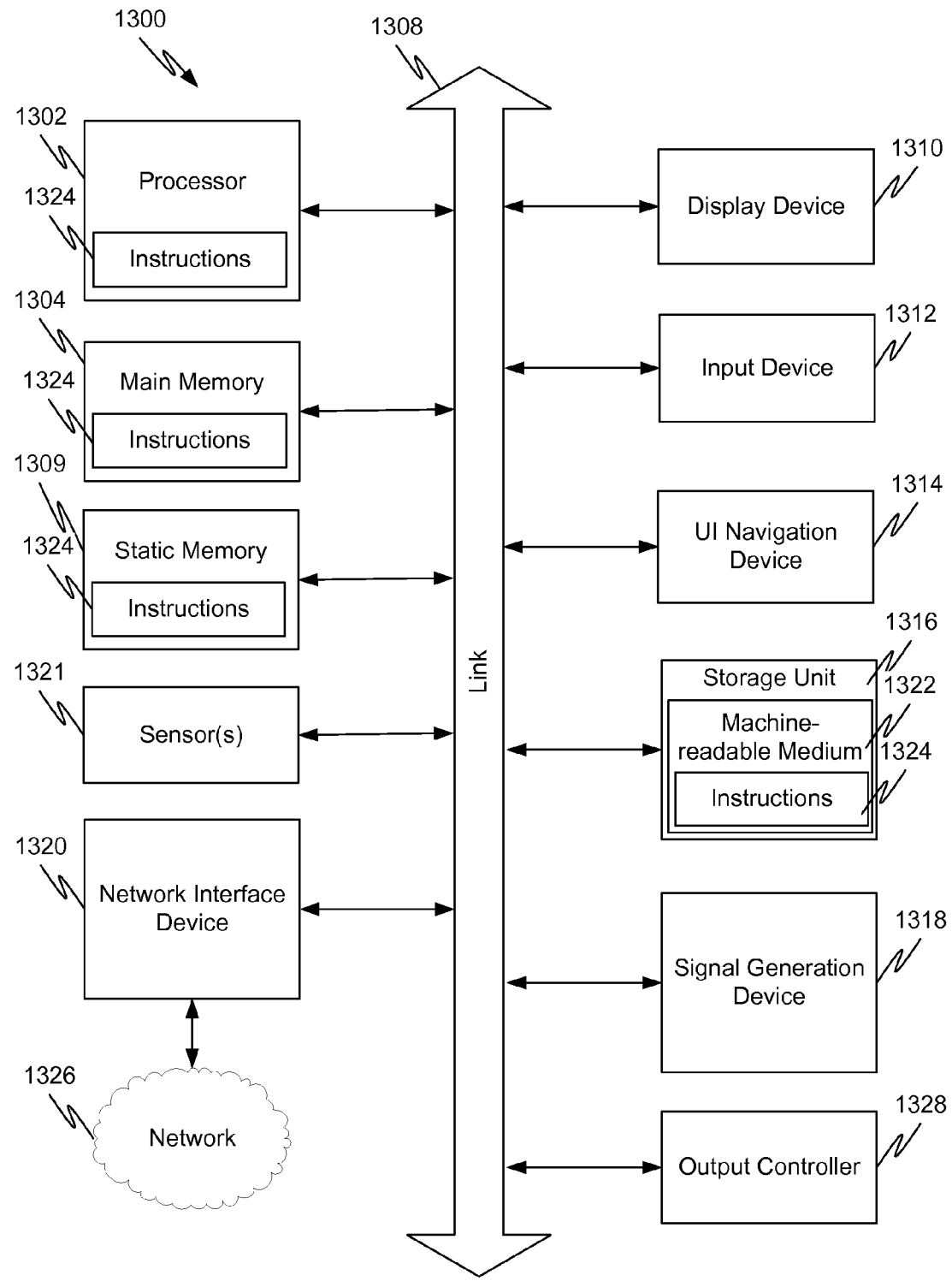
FIG. 13 is a block diagram of a machine in the example form of a processing system within which may be executed a set of instructions for causing the machine to perform any one or more of the methodologies discussed herein including the functions, systems and flow diagrams of FIGS. 1-12.

FIG. 13 is a block diagram of a machine in the example form of a processing system within which may be executed a set of instructions for causing the machine to perform any one or more of the methodologies discussed herein including the functions, systems and flow diagrams of FIGS. 1-12.

In alternative embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a personal computer (PC), a tablet PC, a set-top box (STB), a personal digital assistant (PDA), a cellular telephone, a smart phone, a tablet, a wearable device (e.g., a smart watch or smart glasses), a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example of the machine 1300 includes at least one processor 1302 (e.g., a central processing unit (CPU), a graphics processing unit (GPU), advanced processing unit (APU), or combinations thereof), a main memory 1304 and static memory 1306, which communicate with each other via bus 1308. The machine 1300 may further include graphics display unit 1310 (e.g., a plasma display, a liquid crystal display (LCD), a cathode ray tube (CRT), and so forth). The machine 1300 also includes an alphanumeric input device 1312 (e.g., a keyboard, touch screen, and so forth), a user interface (UI) navigation device 1314 (e.g., a mouse, trackball, touch device, and so forth), a storage unit 1316, a signal generation device 1328 (e.g., a speaker), sensor(s) 1321 (e.g., global positioning sensor, accelerometer(s), microphone(s), camera(s), and so forth) and a network interface device 1320.

Machine-Readable Medium

The storage unit 1316 includes a machine-readable medium 1322 on which is stored one or more sets of instructions and data structures (e.g., software) 1324 embodying or utilized by any one or more of the methodologies or functions described herein. The instructions 1324 may also reside, completely or at least partially, within the main memory 1304, the static memory 1309, and/or within the processor 1302 during execution thereof by the machine 1300. The main memory 1304, the static memory 1309 and the processor 902 also constituting machine-readable media.

While the machine-readable medium 1322 is shown in an example embodiment to be a single medium, the term "machine-readable medium" may include a single medium or multiple media (e.g., a centralized or distributed database, and/or associated caches and servers) that store the one or more instructions or data structures. The term "machine-readable medium" shall also be taken to include any tangible medium that is capable of storing, encoding or carrying instructions for execution by the machine and that cause the machine to perform any one or more of the methodologies of the present invention, or that is capable of storing, encoding or carrying data structures utilized by or associated with such instructions. The term "machine-readable medium" shall accordingly be taken to include, but not be limited to, solid-state memories, and optical and magnetic media. Specific examples of machine-readable media include non-volatile memory, including by way of example semiconductor memory devices, e.g., erasable programmable read-only memory (EPROM), electrically erasable programmable read-only memory (EEPROM), and flash memory devices; magnetic disks such as internal hard disks and removable disks; magneto-optical disks; and CD-ROM and DVD-ROM disks. The term machine-readable medium specifically excludes non-statutory signals per se.

Transmission Medium

The instructions 1324 may further be transmitted or received over a communications network 1326 using a transmission medium. The instructions 1324 may be transmitted using the network interface device 1320 and any one of a number of well-known transfer protocols (e.g., HTTP). Transmission medium encompasses mechanisms by which the instructions 1324 are transmitted, such as communication networks. Examples of communication networks include a local area network ("LAN"), a wide area network ("WAN"), the Internet, mobile telephone networks, plain old telephone (POTS) networks, and wireless data networks (e.g., WiFi and WiMax networks). The term "transmission medium" shall be taken to include any intangible medium that is capable of storing, encoding or carrying instructions for execution by the machine, and includes digital or analog communications signals or other intangible media to facilitate communication of such software.

Although an embodiment has been described with reference to specific example embodiments, it will be evident that various modifications and changes may be made to these embodiments without departing from the broader spirit and scope of the invention. Accordingly, the specification and drawings are to be regarded in an illustrative rather than a restrictive sense. The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

What is claimed is:

1. A method for altering the status of cryptographic key material, the method comprising:
   receive a request to create a geo-fence key material used to authenticate a first system to a second system, the geo-fence key material having an associated validity state identifying whether the geo-fence key material is valid for authentication or invalid for authentication;
   create a geo-fence attribute set comprising:
      a geo-fence describing at least one geographic area;
      a policy containing at least one condition under which the validity state is valid for authentication or invalid for authentication; and
      a delegate identifier identifying at least one entity authorized to perform a task on behalf of the holder of the geo-fence key material;
   cause an association between the geo-fence attribute set and cryptographic key material to create the geo-fence key material; and
   deploy the geo-fence key material to a system.

2. The method of claim 1, further comprising:
   determining whether template information is available;
   responsive to template information being available, utilizing the template information to create the geo-fence attribute set.

3. The method of claim 1 wherein the at least one condition comprises a time period and wherein the status of the geo-fence key material is set to suspended if a geo-location update message was not received during the time period.

4. The method of claim 1 further comprising receive a request to determine a state of the geo-fence key material and identify whether the state is suspended or reinstated.

5. The method of claim 4 wherein determining the state of the geo-fence key material comprises evaluating conditions defined in the geo-fence attribute set that identify when the state of the geo-fence key material should be suspended and when the state of the geo-fence key material should be reinstated.

6. The method of claim 5 wherein the conditions comprise whether the system resides inside or outside the geo-fence.

7. The method of claim 1, wherein causing the association between the cryptographic key material and the geo-fence attribute set comprises creating a certificate.

8. The method of claim 1, wherein causing the association between the cryptographic key material and the geo-fence attribute set comprises causing storage of the geo-fence key material on the system.

9. A system comprising:
   a processor and executable instructions accessible on a computer-readable medium that, when executed, cause the processor to perform operations comprising:
      receive a request, from a subscriber, to create a geo-fence key material used to authenticate a first system to a second system, the geo-fence key material having an associated validity state identifying whether the geo-fence key material is valid for authentication or invalid for authentication;
      create a geo-fence attribute set comprising:
         a geo-fence describing at least one geographic area; and
         at least one condition under which the geo-fence key material validity state will be set to valid or invalid;
      cause an association between the geo-fence attribute set and cryptographic key material to create the geo-fence key material;
      deploy the geo-fence key material to a system.

10. The system of claim 9, wherein the operations further comprise accessing a template comprising the geo-fence attribute set, the template provided by an authorized entity separate from the subscriber.

11. The system of claim 9 wherein the at least one condition is part of a policy that defines when the validity state of the geo-fence key material is set to invalid and/or when the state of the geo-fence key material is set to valid.

12. The system of claim 9 wherein the instructions further cause the system to:
   receive a request to set a state of the geo-fence key material to suspended or to set the state of the geo-fence key material to reinstated.

13. The system of claim 9 wherein the instructions further cause the system to:
   receive a message that triggers:
      evaluation of a state of the geo-fence key material; and
      responsive to the evaluation, sets the state to suspended or to reinstated.

14. A machine-readable medium having executable instructions encoded thereon, which, when executed by at least one processor of a machine, cause the machine to perform operations comprising:
   receive a request to create a geo-fence key material used to authenticate a first system to a second system, the geo-fence key material having an associated validity state identifying whether the geo-fence key material is valid for authentication or invalid for authentication;
   determine whether a template is available from an authorized entity that contains a template geo-fence attribute set;
   responsive to a template being available:
      retrieve the template geo-fence attribute set from the template and set geo-fence attribute information to the retrieved template geo-fence attribute set responsive to a template not being available:
      retrieve geo-fence attribute information from information provided by a subscriber;

create a geo-fence attribute set from the geo-fence attribute information, the geo-fence attribute set comprising:
- a geo-fence describing at least one geographic area; and
- at least one condition under which the state associated with the geo-fence key material will be set to valid and/or invalid;

cause an association between the geo-fence attribute set and cryptographic key material to create the geo-fence key material;

deploy the geo-fence key material to a system of the subscriber.

15. The machine-readable medium of claim 14 wherein the at least one condition is part of a policy that identifies when a status of the cryptographic key material is to be set to either a suspended state where the cryptographic key material will not be honored to validate the system in an authenticated session or a reinstated state where the cryptographic key material will be honored to validate the system in an authenticates session.

16. The machine-readable medium of claim 14 wherein to deploy the geo-fence key material to the system, the executable instructions cause the machine to perform operations comprising:
   cause storage of the geo-fence attribute set on the system at least one of either an SSH private use header or as part of SSH key options.

17. The machine-readable medium of claim 14 wherein to cause the association between the geo-fence attribute set and the cryptographic key material, the executable instructions cause the machine to perform operations comprising create a certificate comprising the geo-fence attribute set and at least a portion of the cryptographic key material.

18. The machine-readable medium of claim 14 wherein the executable instructions cause the machine to perform further operations comprising:
   receive a request to change the validity status of the geo-fence key material to a state indicating the cryptographic key material will not be honored to validate the system in an authenticated session.

19. The machine-readable medium of claim 17 wherein the executable instructions cause the machine to perform further operations comprising:
   receive a request to change the validity status of the geo-fence key material to a state indicating the cryptographic key material will be honored to validate the system in an authenticated session.

20. The machine-readable medium of claim 18 wherein the executable instructions cause the machine to perform at least one further operations comprising:
   remove an identifier associated with the cryptographic key material on a second system; or
   replace the identifier associated with the cryptographic key material on the second system.

* * * * *

UNITED STATES PATENT AND TRADEMARK OFFICE
CERTIFICATE OF CORRECTION

PATENT NO. : 9,647,998 B2  
APPLICATION NO. : 14/221981  
DATED : May 9, 2017  
INVENTOR(S) : Remo Ronca Page 1 of 1

It is certified that error appears in the above-identified patent and that said Letters Patent is hereby corrected as shown below:

In the Specification

In Column 22, Line 38, delete "712" and insert --702-- therefor

Signed and Sealed this
Fourteenth Day of April, 2020

Andrei Iancu
*Director of the United States Patent and Trademark Office*